US010667327B2

(12) United States Patent
Yoshimura et al.

(10) Patent No.: US 10,667,327 B2
(45) Date of Patent: May 26, 2020

(54) WIRELESS COMMUNICATION APPARATUS, COMMUNICATION METHOD, AND INTEGRATED CIRCUIT

(71) Applicant: SHARP KABUSHIKI KAISHA, Sakai, Osaka (JP)

(72) Inventors: Tomoki Yoshimura, Sakai (JP); Hiromichi Tomeba, Sakai (JP); Yasuhiro Hamaguchi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 15 days.

(21) Appl. No.: 15/579,562

(22) PCT Filed: Jun. 2, 2016

(86) PCT No.: PCT/JP2016/066387
§ 371 (c)(1),
(2) Date: Dec. 4, 2017

(87) PCT Pub. No.: WO2016/195010
PCT Pub. Date: Dec. 8, 2016

(65) Prior Publication Data
US 2018/0167997 A1 Jun. 14, 2018

(30) Foreign Application Priority Data
Jun. 5, 2015 (JP) .................................. 2015-114373

(51) Int. Cl.
H04W 84/12 (2009.01)
H04W 74/08 (2009.01)
H04W 28/06 (2009.01)

(52) U.S. Cl.
CPC ........... *H04W 84/12* (2013.01); *H04W 28/06* (2013.01); *H04W 74/08* (2013.01); *H04W 74/0808* (2013.01)

(58) Field of Classification Search
CPC ...... H04W 84/12; H04W 28/06; H04W 74/08
See application file for complete search history.

(56) References Cited

U.S. PATENT DOCUMENTS

2003/0123405 A1    7/2003  del Prado et al.
2013/0003628 A1*   1/2013  Christin ............ H04W 52/0238
                                                370/311

(Continued)

FOREIGN PATENT DOCUMENTS

JP    2004-525586 A    8/2004
JP    2013-511182 A    3/2013

OTHER PUBLICATIONS

Suhwook Kim et al.; OBSS preamble detection evaluation; May 11, 2015; IEEE 802.11-15/0551r0; LG Electronics.

(Continued)

Primary Examiner — Melvin C Marcelo
(74) Attorney, Agent, or Firm — ScienBiziP, P.C.

(57) ABSTRACT

A BSS to which a destination wireless communication apparatus of a physical layer frame belongs is identified, and accuracy of preamble detection is improved by changing a reception operation. A wireless communication apparatus includes a reception unit that detects a frame including information for identifying a BSS, and a control unit that switches between a first operation in a case where the frame is a frame which is associated with a BSS to which the wireless communication apparatus belongs and a second operation in a case where the frame is a frame which is not associated with the BSS to which the wireless communication apparatus belongs. Carrier sensing is not performed in the first operation, and the carrier sensing is performed in the second operation.

15 Claims, 12 Drawing Sheets

(56) References Cited

U.S. PATENT DOCUMENTS

2014/0029433 A1\* 1/2014 Wentink ............. H04N 21/4126
370/236
2016/0242210 A1\* 8/2016 Seok ..................... H04W 28/18
2018/0167970 A1\* 6/2018 Yoshimura .......... H04W 74/006

OTHER PUBLICATIONS

Jiyong Pang et al.; OBSS preamble error probability; May 11, 2015; IEEE 802.11-15/0583r0; Huawei Technologies.
Hongyuan Zhang et al.; Preamble Design and Auto-detection; May 11, 2015; IEEE 802.11-15/0579; Marvell Semiconductor, Inc.

\* cited by examiner

FIG. 10

| Index | TRANSMISSION RATE (Mbps) | $N_{ops}$ |
|---|---|---|
| 1101 | 6 | 3 |
| 1111 | 9 | 4.5 |
| 0101 | 12 | 6 |
| 0111 | 18 | 9 |
| 1001 | 24 | 12 |
| 1011 | 36 | 18 |
| 0001 | 48 | 24 |
| 0011 | 54 | 27 |

WIRELESS COMMUNICATION APPARATUS, COMMUNICATION METHOD, AND INTEGRATED CIRCUIT

TECHNICAL FIELD

The present invention relates to a wireless communication apparatus, a communication method, and an integrated circuit.

BACKGROUND ART

The Institute of Electrical and Electronics Engineers Inc. (IEEE) 802.11ac which achieves a higher data rate in IEEE 802.11 which is a wireless local area network (LAN) standard is developed by the IEEE. Currently, standardization of IEEE 802.11ax is started as the succeeding standard of IEEE 802.11ac. As wireless LAN devices have been propagated rapidly, even in the standardization of IEEE 802.11ax, the improvement of throughput for each user in an environment has been examined in which the wireless LAN devices are overcrowded.

The wireless LAN device monitors a preamble defined in IEEE 802.11, and demodulates a physical layer convergence protocol (PLCP) header or a data signal in a case where the preamble is detected. For example, as the preamble defined in IEEE 802.11, there are legacy-short training sequence (L-STF) and legacy-long training sequence (L-LTF). An operation needed to demodulate a data signal such as synchronization or channel estimation may be performed by using these preambles.

The wireless LAN device detects the preamble, and then receives the PLCP header. The PLCP header includes information (modulation and coding scheme (MCS) or the like) needed to demodulate the data signal subsequent thereto. PLCP headers are differently defined depending on the types of the IEEE 802.11 standards such as a high throughput-signal (HT-SIG) defined in IEEE 802.11n and a very high throughput-signal (VHT-SIG) defined in IEEE 802.11ac. Meanwhile, as a mechanism for protecting a terminal apparatus (legacy terminal apparatus) corresponding to the conventional standard (IEEE 802.11a/b/g or the like), legacy-signal (L-SIG) is generally inserted after L-LTF.

For example, the L-SIG may include information regarding a signal transmission period of a transmission frame including the L-SIG. The wireless LAN device that receives the L-SIG including the information regarding the signal transmission period may acquire information for configuring a network allocation vector (NAV) without receiving the data signal subsequent to the L-SIG.

As stated above, since the preamble and the PLCP header include various information items such as information regarding the signal transmission period or the demodulation of the data signal, the wireless LAN device needs to detect the preamble and the PLCP header with high accuracy.

CITATION LIST

Non Patent Literature

NPL 1: IEEE 802.11-15/0551r0 OBSS preamble detection evaluation

NPL 2: IEEE 802.11-15/0583r0 OBSS preamble error probability

SUMMARY OF INVENTION

Technical Problem

In NPL 1 and NPL 2, a problem is pointed out that a preamble detection rate is decreased in the environment in which the wireless LAN devices are overcrowded. There are concerns that the data signal is not able to be demodulated and the NAV is not able to be appropriately configured in a case where the preamble detection fails and that it is difficult to recognize a channel utilization status due to the fail of carrier sense/clear channel assessment (CS/CCA). In the wireless LAN system, since a function of recognizing the channel utilization status through clear channel assessment-energy detection (CCA-ED) in a case where the CS/CCA fails is prescribed but a threshold of the CCA-ED is configured to have a high level, a possibility that an interference will be caused with adjacent wireless LAN devices is increased.

The present invention has been made in view of the above-described problems, and it is an object of the invention to disclose a method of causing a wireless LAN device to appropriately perform preamble detection in order to improve utilization efficiency of a radio resource of a wireless LAN system.

Solution to Problem

A wireless communication apparatus, a communication method, and a communication system according to the present invention for solving the above-described problems are as follows.

(1) That is, a wireless communication apparatus according to the present invention is a wireless communication apparatus that receives a physical layer frame. The wireless communication apparatus includes a reception unit that acquires BSS identification information for identifying a BSS to which a destination wireless communication apparatus of the physical layer frame belongs, and a reception operation determination unit that performs reception execution determination of the physical layer frame based on the BSS identification information. The reception operation determination unit configures the wireless communication apparatus so as not to receive the physical layer frame in a case where it is determined that the physical layer frame is a physical layer frame addressed to a wireless communication apparatus belonging to a BSS different from a BSS to which the wireless communication apparatus belongs based on the BSS identification information. In the case where the reception operation determination unit configures the wireless communication apparatus so as not to perform the reception operation of the physical layer frame, the reception unit performs a reception operation of a physical layer frame other than the physical layer frame.

(2) In the wireless communication apparatus according to (1), in the case where the reception operation determination unit configures the wireless communication apparatus so as not to receive the physical layer frame based on the BSS identification information, a physical layer frame for transmission is not transmitted for a period indicated by information regarding a transmission period of the physical layer frame.

(3) In the wireless communication apparatus according to (2), the information regarding the transmission period of the physical layer frame is acquired from information included in a PLCP header within the physical layer frame.

(4) In the wireless communication apparatus according to (2), the information regarding the transmission period of the physical layer frame is information calculated based on L_LENGTH and L_RATE or information calculated based on LENGTH and MCS.

(5) In the wireless communication apparatus according to any one of (1) to (4), in the case where the wireless communication apparatus is configured by the reception operation determination unit so as not to receive the physical layer frame based on the BSS identification information, the wireless communication apparatus is configured so as to be on standby for transmission based on an IFS period.

(6) A communication method of a wireless communication apparatus according to the present invention is a communication method of a wireless communication apparatus. The wireless communication apparatus performs the communication method including at least a step of providing a reception unit that acquires BSS identification information for identifying a BSS to which a destination wireless communication apparatus of a physical layer frame belongs, a step of providing a reception operation determination unit that performs reception execution determination of the physical layer frame based on the BSS identification information, a step of configuring the wireless communication apparatus so as not to receive the physical layer frame in a case where the reception operation determination unit determines that the physical layer frame is a physical layer frame addressed to a wireless communication apparatus belonging to a BSS different from a BSS to which the wireless communication apparatus belongs based on the BSS identification information, and a step of causing the reception unit to perform a reception operation of a physical layer frame other than the physical layer frame in the case where the reception operation determination unit configures the wireless communication apparatus so as not to perform the reception operation of the physical layer frame.

(7) A communication system according to the present invention is a communication system including a wireless communication apparatus. The wireless communication apparatus includes a reception unit that acquires BSS identification information for identifying a BSS to which a destination wireless communication apparatus of a physical layer frame belongs and a reception operation determination unit that performs reception execution determination of the physical layer frame based on the BSS identification information. The reception operation determination unit configures the wireless communication apparatus so as not to receive the physical layer frame in a case where it is determined that the physical layer frame is a physical layer frame addressed to a wireless communication apparatus belonging to a BSS different from a BSS to which the wireless communication apparatus belongs based on the BSS identification information. In the case where the reception operation determination unit configures the wireless communication apparatus so as not to perform the reception operation of the physical layer frame, the reception unit performs a reception operation of a physical layer frame other than the physical layer frame.

Advantageous Effects of Invention

According to the present invention, the terminal apparatus and the base station apparatus can constitute an appropriate wireless network.

BRIEF DESCRIPTION OF DRAWINGS

FIG. 10 is a diagram showing an example of the correspondence between transmission rates and indices in the mapping according to the present invention.

DESCRIPTION OF EMBODIMENTS

Figure 1:
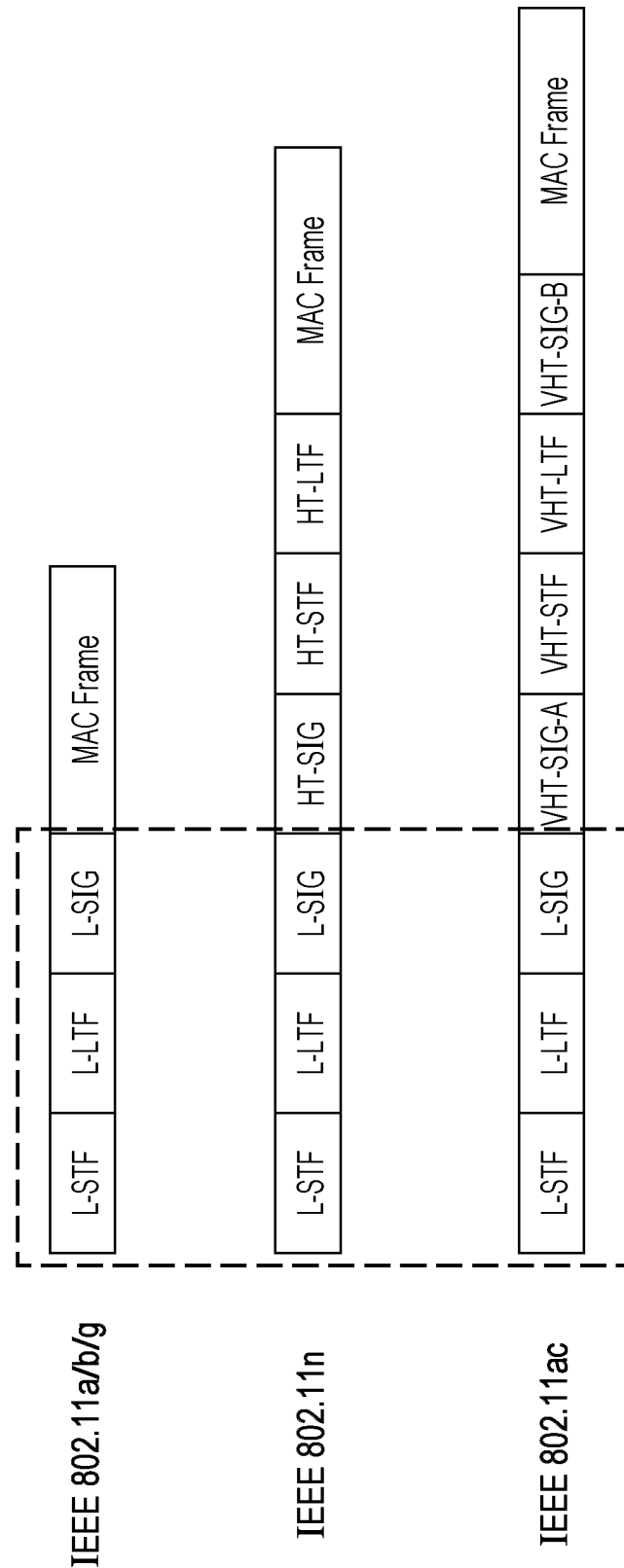
FIG. 1 is a diagram showing an example of a configuration of a PPDU transmitted by a wireless communication apparatus according to the present invention.

A communication system according to the present embodiment includes a wireless transmission apparatus (an access point or a base station apparatus) and a plurality of wireless reception apparatuses (stations and terminal apparatuses). A network including the base station apparatus and the terminal apparatuses is referred to as a Basic Service Set (BSS: management range). The base station apparatus and the terminal apparatus are referred to as a wireless apparatus.

It is assumed that the base station apparatus and the terminal apparatuses within the BSS communicate with each other based on carrier sense multiple access with collision avoidance (CSMA/CA). Although it will be described in the present embodiment that an infrastructure mode in which the base station apparatus communicates with a plurality of terminal apparatuses is used, a method of the present embodiment may be performed in an ad hoc mode in which the terminal apparatuses directly communicate with each other. In the ad hoc mode, the terminal apparatus constitutes the BSS instead of the base station apparatus. The BSS in the ad hoc mode is also referred to as an independent Basic Service Set (IBSS). Hereinafter, the terminal apparatus constituting the IBSS in the ad hoc mode may be regarded as the base station apparatus.

In an IEEE 802.11 system, the apparatuses may transmit multiple frame types of transmission frames having a common frame format. The transmission frames are defined by a physical (PHY) layer, a medium access control (MAC) layer, and a logical link control (LLC) layer.

The transmission frame of the PHY layer is referred to as a physical protocol data unit (PPDU: PHY protocol data unit or physical layer frame). The PPDU includes a physical layer header (PHY header) including header information for performing signal processing in the physical layer and a physical service data unit (PSDU: PHY service data unit or MAC layer frame) which is a data unit processed in the physical layer. The PSDU may be constituted by an aggregated MPDU (A-MPDU) acquired by aggregating a plurality of MAC protocol data units (MPDUs) which is retransmission units in a wireless section.

The PHY header includes reference signals such as a short training field (STF) used for detecting and synchronizing signals and a long training field (LTF) used for acquiring channel information for demodulating data and control signals such as a signal (SIG) including control information for demodulating data. The STF is classified into Legacy-STF (L-STF), High throughput-STF (HT-STF), Very high throughput-STF (VHT-STF), and High efficiency-STF (HE-STF) according to the corresponding standards. Similarly, the LTF is classified into L-LTF, HT-LTF, VHT-LTF, and HE-LTF, and the SIG is classified into L-SIG, HT-SIG, VHT-SIG, and HE-SIG. The VHT-SIG is classified into VHT-SIG-AT and VHT-SIG-B.

The PHY header may include information (hereinafter, also referred to as BSS identification information) for identifying a BSS of a transmission source of the transmission frame. For example, the information for identifying the BSS may be a service set identifier (SSID) of the BSS or a MAC address of the base station apparatus of the BSS. The information for identifying the BSS may be a value (for example, BSS color) specific to the BSS other than the SSID or the MAC address.

The PPDU is modulated according to the corresponding standard. For example, the PPDU is modulated into an orthogonal frequency division multiplexing (OFDM) signal in a case where the IEEE 802.11n standard is used.

The MPDU includes a MAC layer header (MAC header) including header information for performing signal processing in the MAC layer, a MAC service data unit (MSDU) which is a data unit processed in the MAC layer or a frame body, and a frame check sequence (FCS) for checking whether or not an error occurs in the frame. A plurality of MSDUs may be aggregated as an aggregated MSDU (A-MSDU).

The frame type of the transmission frame of the MAC layer is largely classified into three data frames including a management frame for managing a connection mode between the apparatuses, a control frame for managing a communication mode between the apparatuses, and a data frame including actual transmission data, and these frame types are further classified into multiple types of subframe types. The control frame includes a reception completion notification (acknowledge (Ack)) frame, a transmission request (request to send (RTS)) frame, and a reception preparation completion (clear to send (CTS)) frame. The management frame includes a beacon frame, a probe request frame, a probe response frame, an authentication frame, an association request frame, and an association response frame. The data frame includes a data frame and a polling (CF-poll) frame. Each apparatus may recognize a frame type and a subframe type of the received frame by reading the content of a frame control field included in the MAC header.

Ack may include Block Ack. Block Ack may be acknowledged to the plurality of MPDUs.

The beacon frame includes a field in which a beacon interval at which beacons are transmitted or the SSID is written. The base station apparatus may periodically broadcast the beacon frame within the BSS, and the terminal apparatus may recognize the base station apparatus near the terminal apparatus by receiving the beacon frame. A case where the terminal apparatus recognizes the base station apparatus based on the beacon frame broadcast from the base station apparatus is referred to as passive scanning. Meanwhile, a case where the terminal apparatus probes the base station apparatus by broadcasting the probe request frame within the BSS is referred to as active scanning. The base station apparatus may transmit the probe response frame as a response to the probe request frame, and the written content of the probe response frame may be equivalent to the beacon frame.

The terminal apparatus recognizes the base station apparatus, and then performs a process of connection establishment with the base station apparatus. The process of connection establishment is classified into an authentication procedure and an association procedure. The terminal apparatus transmits the authentication frame (authentication request) to the base station apparatus desired to be connected. In a case where the authentication frame is received, the base station apparatus transmits the authentication frame (authentication response) including a status code indicating whether or not the terminal apparatus is authenticated to the terminal apparatus. The terminal apparatus may determine whether or not the authentication of the terminal apparatus is permitted by the base station apparatus by reading the status code written in the authentication frame. The base station apparatus and the terminal apparatus may exchange the authentication frame multiple number of times.

Subsequently to the authentication procedure, the terminal apparatus transmits the association request frame in order to perform the association procedure with the base station apparatus. In a case where the association request frame is received, the base station apparatus determines whether or not to permit the connection of the terminal apparatus, and transmits the association response frame in order to notify the terminal apparatus of the determination result. In addition to a status code indicating whether or not the connection process is performed, an association identifier (AID) for identifying the terminal apparatus is written in the association response frame. The base station apparatus may manage the plurality of terminal apparatuses by configuring different AIDs to the terminal apparatuses for which the connection is permitted.

After the connection process is performed, the base station apparatus and the terminal apparatus perform actual data transmission. In the IEEE 802.11 system, a distributed coordination function (DCF), a point coordination function (PCF), an enhanced function (enhanced distributed channel access (EDCA)) thereof, and a hybrid coordination function (HCF) are defined. Hereinafter, an example in which the base station apparatus transmits signals to the terminal apparatus in the DCF will be described.

In the DCF, the base station apparatus and the terminal apparatus perform carrier sensing (CS) for checking a utilization situation of radio channels near the base station apparatus and the terminal apparatus before communication is performed. For example, in a case where a signal of which a clear channel assessment level (CCA level) is higher than a predetermined clear channel assessment level is received on the radio channel, the base station apparatus which is a transmission station postpones the transmission of the transmission frame on the radio channel. Hereinafter, in the radio channel, a state in which the signal of which the CCA level is equal to or greater than the predetermined CCA level is detected is referred to as a busy mode, and a state in which the signal of which the CCA level is equal to or greater than the predetermined CCA level is not detected is referred to as an idle mode. As stated above, the CS performed based on power (received power level) of the signal actually received by each apparatus is referred to as physical carrier sensing (physical CS). The CCA level is also referred to as a carrier sensing level (CS level) or a CCA threshold (CCAT). In a case where the signal of which the CCA level is equal to or greater than the predetermined CCA level is detected, the base station apparatus and the terminal apparatus perform an operation for demodulating at least the signal of the PHY layer.

The base station apparatus performs the carrier sensing by only an inter frame space (IFS) corresponding to the type of the transmission frame to be transmitted, and determines whether the radio channel is in the busy mode or the idle mode. Periods during which the base station apparatus performs the carrier sensing are different depending on the frame types and the subframe types of the transmission frames to be transmitted by the base station apparatus. In the IEEE 802.11 system, a plurality of IFSs of which periods are different from each other is defined. There are a short inter frame space (SIFS: short IFS) used for the transmission frame to which the highest priority is given, a polling inter frame space (PCF IFS: PIFS) used for the transmission frame to which the relatively high priority is given, and a distribution control inter frame space (DCF IFS: DIFS) used for the transmission frame to which the lowest priority is given. In a case where the base station apparatus transmits the data frame in the DCF, the base station apparatus uses the DIFS.

After the base station apparatus is on standby for the DIFS, and is further on standby for a random backoff time for avoiding frame collision. In the IEEE 802.11 system, a random backoff time called a contention window (CW) is used. In CSMA/CA, it is assumed that a transmission frame transmitted by a certain transmission station is received by a reception station in a state in which there is no interference from another transmission station. Thus, in a case where the transmission stations transmit the transmission frames in the same timing, the frames collide with each other, and thus, the reception stations are not able to correctly receive the frames. Before the transmission stations start the transmission, the transmission stations are on standby for a randomly configured time, and thus, the frame collision is avoided. In a case where it is determined that the radio channel is in the idle mode through the carrier sensing, the base station apparatus may start to count down the CW, may initially acquire a transmission right when the CW becomes zero, and may transmit the transmission frame to the terminal apparatus. In a case where it is determined that the radio channel is the busy mode through the carrier sensing for a period during which the CW is counted down, the base station apparatus stops counting down the CW. In a case where the radio channel is in the idle mode, the base station apparatus restarts counting down the remaining CW subsequently to the previous IFS.

The terminal apparatus which is the reception station receives the transmission frame, reads the PHY header of the transmission frame, and demodulates the received transmission frame. The terminal apparatus may recognize whether or not the transmission frame is addressed to the terminal apparatus by reading the MAC header of the demodulated signal. The terminal apparatus may determine the destination of the transmission frame based on information (for example, a group identifier (GID: group ID) written in the VHT-SIG-A) written in the PHY header.

The terminal apparatus determines that the received transmission frame is addressed to the terminal apparatus, and needs to transmit an ACK frame indicating that the frame is correctly received to the base station apparatus which is the transmission station in a case where the transmission frame is demodulated without error. The ACK frame is one of the transmission frames having the highest priority transmitted after the base station apparatus is on standby only for the SIFS period (the random backoff time is not taken). The base station apparatus receives the ACK frame transmitted from the terminal apparatus, and ends a series of communication operations. In a case where the terminal apparatus does not correctly receive the frame, the terminal apparatus does not transmit the ACK. Accordingly, in a case where the ACK frame is not received from the reception station for a predetermined period (SIFS+ACK frame length) after the frame is transmitted, the base station apparatus determines that the communication fails, and ends the communication. As mentioned above, the end of the communication (also referred to as a burst) performed once in the IEEE 802.11 system needs to be determined depending on whether or not the ACK frame is received except for a special case such as a case where a broadcast signal such as a beacon frame is transmitted or a case where fragmentation for dividing the transmission data is used.

In a case where it is determined that the received transmission frame is not addressed to the terminal apparatus, the terminal apparatus configures a network allocation vector (NAV) based on the length of the transmission frame written in the PHY header. The terminal apparatus does not attempt communication for a period configured for the NAV. That is, since the terminal apparatus performs the same operation as in a case where it is determined that the radio channel is in the busy mode through the physical CS for a period configured for the NAV, communication control using the NAV is also referred to as virtual carrier sensing (virtual CS). In addition to the case where the NAV is configured based on the information written in the PRY header, the NAV is also configured based on the clear to send (CTS) frame or the request to send (RTS) frame introduced in order to resolve a hidden terminal problem.

Each apparatus performs the carrier sensing and autonomously acquires the transmission right in the DCF, whereas a control station called a point coordinator (PC) controls the transmission right of each apparatus within the BSS in the PCF. In general, the base station apparatus is the PC, and acquires the transmission right of the terminal apparatus within the BSS.

A communication period of the PCF includes a contention free period (CFP) and a contention period (CP). Communication is performed based on the above-described DCF for the CP, and the PC controls the transmission right for the CFP. The base station apparatus which is the PC broadcasts the beacon frame in which the period (CFP max duration) of the CFP is written within the BSS before the communication of the PCF is performed. The PIFS is used in the transmission of the beacon frame broadcast in a case where the transmission of the PCF is started, and is transmitted without waiting for the CW. The terminal apparatus that receives the beacon frame configures the period of the CFP written in the beacon frame for the NAV. The terminal apparatus may acquire the transmission right only in a case where a signal (for example, a data frame including CF-poll) for signaling the acquisition of the transmission right transmitted from the PC is received until the NAV elapses or a signal (for example, a data frame including CF-end) for broadcasting the end of the CFP within the BSS is received. Since the collision of the packets within the same BSS does not occur within the period of the CFP, each terminal apparatus does not use the random backoff time used in the DCF.

Hereinafter, the base station apparatus and the terminal apparatus are referred to as the wireless communication apparatus. Information exchanged in a case where a certain wireless communication apparatus communicates with another wireless communication apparatus is also referred to as data. That is, the wireless communication apparatus includes the base station apparatus and the terminal apparatus.

The wireless communication apparatus has any one or both of a function of transmitting the PPDU and a function of receiving the PPDU. FIG. 1 is a diagram showing an example of the configuration of the PPDU transmitted by the wireless communication apparatus. The PPDU corresponding to the IEEE 802.11a/b/g standard includes L-STF, L-LTF, L-SIG, and a MAC frame (a payload, a data portion, data, or an information bit). The PPDU corresponding to the IEEE 802.11n standard includes L-STF, L-LTF, L-SIG, HT-SIG, HT-STF, HT-LTF, and a MAC frame. The PPDU corresponding to the IEEE 802.11ac standard includes L-STF, L-LTF, L-SIG, VHT-SIG-A, VHT-STF, VHT-LTF, VHT-SIG-B, and a MAC frame in whole or part.

The L-STF, the L-LTF, and the L-SIG surrounded by the dotted line of FIG. 1 are used commonly to the IEEE 802.11 standards (hereinafter, the L-STF, the L-LTF, and the L-SIG are also referred to as an L-header). That is, for example, the wireless communication apparatus corresponding to the IEEE 802.11a/b/g standard may appropriately receive the L-header within the PPDU corresponding to the IEEE 802.11n/ac standard. The wireless communication apparatus corresponding to the IEEE 802.11a/b/g standard may receive the PPDU corresponding to the IEEE 802.11n/ac standard as the PPDU corresponding to the IEEE 802.11a/b/g standard.

However, since the wireless communication apparatus corresponding to the IEEE 802.11a/b/g standard is not able to demodulate the PPDU corresponding to the IEEE 802.11n/ac standard, which is subsequent to the L-header, this wireless communication apparatus is not able to demodulate information regarding a Duration/ID field used in the configuration of the NAV, a transmitter address (TA), or a receiver address (RA).

As a method for causing the wireless communication apparatus corresponding to the IEEE 802.11a/b/g standard to appropriately configure the NAV (or to perform a reception operation for a prescribed period), the IEEE 802.11 prescribes a method of inserting Duration information into the L-SIG. Information (RATE field, L-RATE field, L-RATE, L_DATARATE, or L_DATARATE field) regarding a transmission speed within the L-SIG and information (LENGTH field, L-LENGTH field, or L-LENGTH) regarding a transmission period are used in order for the wireless communication apparatus corresponding to the IEEE 802.11a/b/g standard to appropriately configure the NAV.

Figure 2:
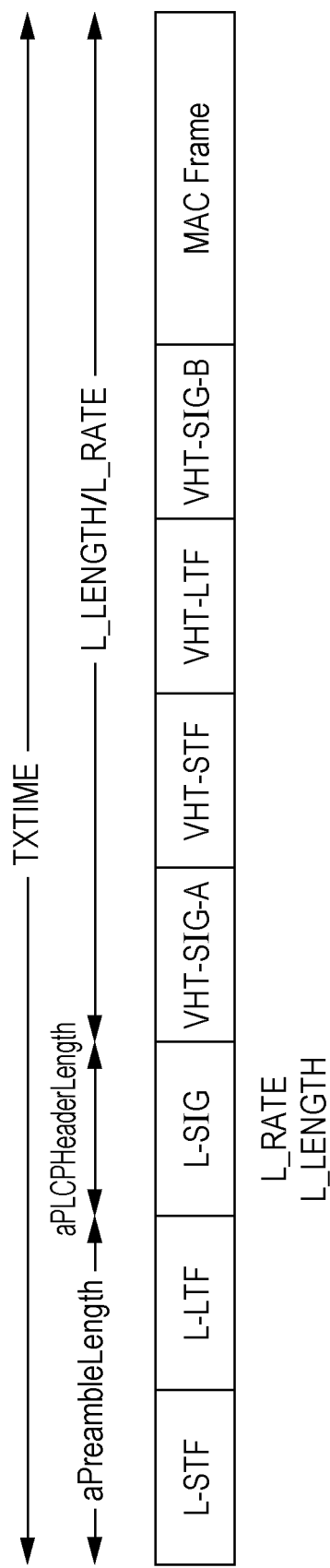
FIG. 2 is a diagram showing an example of a method of inserting Duration information into an L-SIG according to the present invention.

FIG. 2 is a diagram showing an example of the method of inserting the Duration information into the L-SIG. FIG. 2 shows an example of the configuration of the PPDU corresponding to the IEEE 802.11ac standard, and the configuration of the PPDU is not limited thereto. The configuration of the PPDU corresponding to the IEEE 802.11n standard and the configuration of the PPDU corresponding to the IEEE 802.11ax standard may be used. TXTIME includes information regarding a length of the PPDU, aPreambleLength includes information regarding the length of a preamble (L-STF+L-LTF), and aPLCPHeaderLength includes information regarding a length of a PLCP header (L-SIG). The following Expression (1) is an expression showing an example of a method of calculating L_LENGTH.

[Expression 1]

$$\text{L\_LENGTH} = \left\lceil \frac{\begin{array}{c}((TXTIME - SignalExtension) - \\ (aPreambleLength + aPLCPHeaderLength))\end{array}}{aSymbolLength} \right\rceil \times N_{ops} - \left\lceil \frac{aPLCPServiceLength + aPLCPConvolutionalTailLength}{8} \right\rceil \quad (1)$$

In this expression, SignalExtension is, for example, a virtual period configured in order to achieve compatibility between the IEEE 802.11 standards, and Nops is information associated with L_RATE. The relationship between the Nops and the L_RATE is represented in FIG. 10. aSymbolLength is information regarding a period of one symbol (OFDM symbol), aPLCPServiceLength is the number of bits included in a PLCP Service field, and aPLCPConvolutionalTailLength is the number of tail bits of a convolutional code. For example, the wireless communication apparatus may calculate L_LENGTH by using Expression (1), and may insert the calculated L_LENGTH into the L-SIG. The method of calculating the L_LENGTH is not limited to Expression (1). For example, the L_LENGTH may be calculated by using the following Expression (2).

[Expression 2]

$$\text{L\_LENGTH} = \left\lceil \frac{((TXTIME - SignalExtension) - 20)}{4} \right\rceil \times 3 - 3 \quad (2)$$

In a case where the PPDU is transmitted by L-SIG TXOP Protection, the wireless communication apparatus calculates the L_LENGTH by using the following Expression (3) or the following Expression (4).

[Expression 3]

$$\text{L\_LENGTH} = \left\lceil \frac{\begin{array}{c}((L - SIGDuration - SignalExtension) - \\ (aPreambleLength + aPLCPHeaderLength))\end{array}}{aSymbolLength} \right\rceil \times N_{ops} - \left\lceil \frac{aPLCPServiceLength + aPLCPConvolutionalTailLength}{8} \right\rceil \quad (3)$$

[Expression 4]

$$\text{L\_LENGTH} = \left\lceil \frac{((L - SIGDuration - SignalExtension) - 20)}{4} \right\rceil \times 3 - 3 \quad (4)$$

In these expressions, L-SIG Duration is, for example, information regarding a period acquired by adding up the period of the PPDU including the L_LENGTH calculated by using Expression (3) or Expression (4) and the periods of the Ack and the SIFS to be expected to be transmitted, as a response, from the wireless communication apparatus as the destination. The wireless communication apparatus calculates the L-SIG Duration by using the following Expression (5) or the following Expression (6).

[Expression 5]

$L\text{-SIGDuration} = (T_{init\_PPDU} - (\text{aPreambleLength} + \text{aPLCPHeaderLength})) + \text{SIFS} + T_{Res\_PPDU}$ \quad (5)

[Expression 6]

$L\text{-SIGDuration} = (T_{MACDur} - \text{SIFS} - (\text{aPreambleLength} + \text{aPLCPHeaderLength}))$ \quad (6)

In these expressions, Tinit_PPDU is information regarding the period of the PPDU including L_LENGTH calculated by using the following Expression (5), and TRes_PPDU is information regarding the period of the PPDU to be expected to be transmitted, as the response to the PPDU including L_LENGTH calculated by using Expression (5). TMACDur is information associated with a value of a Duration/ID field included in the MAC frame within the PPDU including L_LENGTH calculated by using Expression (6). The wireless communication apparatus calculates the L_LENGTH by using Expression (5) in a case where the wireless communication apparatus is an initiator (sender, leader, or transmitter), and the wireless communication apparatus calculates the L_LENGTH by using Expression (6) in a case where the wireless communication apparatus is a responder (receiver).

Figure 3:
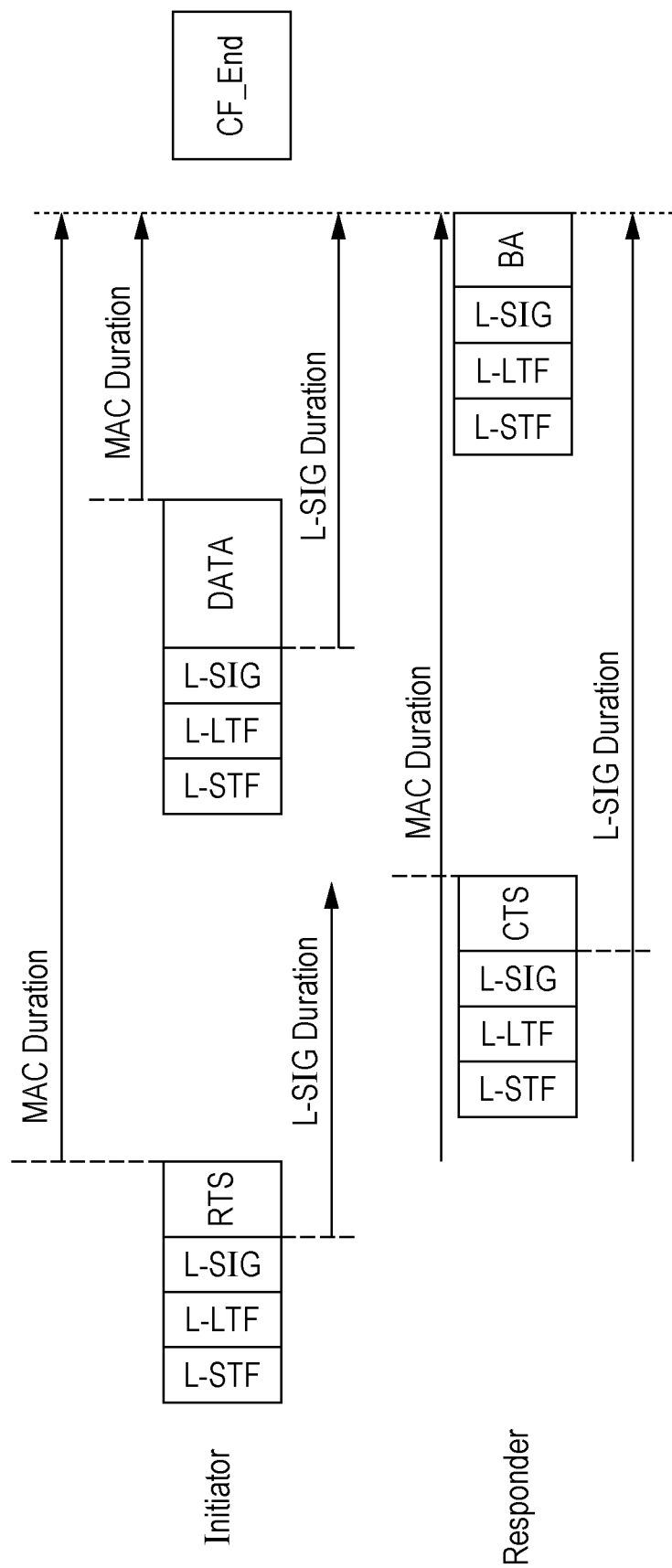
FIG. 3 is a diagram showing an example of L-SIG Duration in L-SIG TXOP Protection.

FIG. 3 is a diagram showing an example of L-SIG Duration in L-SIG TXOP Protection. DATA (frame, payload, or data) includes any one or both of the MAC frame and the PLCP header. BA is Block Ack or Ack. The PPDU may include L-STF, L-LTF, and L-SIG, and may further include any one or a plurality of DATA, BA, RTS, and CTS. Although it has been described in the example shown in FIG. 3 that L-SIG TXOP Protection using RTS/CTS is used, CTS-to-Self may be used. In this example, MAC Duration is a period indicated by the value of Duration/ID field. The initiator may transmit a CF End frame in order to notify of the end of the period of L-SIG TXOP Protection.

Next, a method of identifying the BSS from the frame received by the wireless communication apparatus will be described. In order for the wireless communication apparatus to identify the BSS from the received frame, it is preferable that the wireless communication apparatus that transmits the PPDU inserts information (BSS color, BSS identification information, or a value specific to the BSS) for identifying the BSS into the PPDU.

The BSS identification information may be the SSID of the BSS to which the wireless communication apparatus belongs, may be the MAC address of the AP of the BSS to which the wireless communication apparatus belongs, or may be the GID. The BSS identification information may be information including a plurality of states (color) autonomously selected by the BSS. The plurality of states may be configured through signaling from a certain wireless communication apparatus or a higher layer.

For example, the wireless communication apparatus may construct the PPDU such that the BSS identification information is added to L-LTF, HT-LTF, VHT-LTF, or HE-LTF (hereinafter, also referred to as LTF). The wireless communication apparatus may perform different cyclic shifts on LTF based on the value of the BSS identification information, or may use different coding schemes on LTF based on the value of the BSS identification information. In a case where the cyclic shift is performed on LTF, it is preferable that the same cyclic shift is performed on any one or both of L-SIG and DATA subsequent to LTF in consideration of backward compatibility with the wireless communication apparatus corresponding to the conventional IEEE 802.11 standard. It is preferable that a cyclic shift amount is an amount that does not exceed a size of guard interval (GI) (CP or Cyclic Prefix).

For example, the wireless communication apparatus may add the BSS identification information to the L-SIG. For example, the wireless communication apparatus may add the BSS identification information within L_RATE within the L-SIG. L_RATE is constituted by 4-bit information bits, and transmission rates are mapped to these information bits.

FIG. 10 is a diagram showing an example of the correspondence between transmission rates and Index in the mapping using the 4-bit information bits. L_LENGTH/L_RATE is calculated as L_LATE, and thus, TXTIME or L-SIG Duration may be acquired.

Meanwhile, the L_LENGTH may be calculated by using any of Expression (1) to Expression (4). Particularly, in a case where L_LENGTH is calculated by using any of Expression (1) and Expression (3), the values of the L_RATE and the L_LENGTH may be configured in view of the relationship between the L_RATE and the Nops represented in FIG. 10. That is, the wireless communication apparatus may select the L_RATE from any of eight transmission rates of FIG. 10. The wireless communication apparatus may configure the L_RATE based on the value of the BSS identification information.

For example, the wireless communication apparatus may perform quadrature phase shift keying (QPSK) modulation on the L-SIG. Although the IEEE 802.11 standard prescribes that binary phase shift keying (BPSK) modulation is performed on the L-SIG, the wireless communication apparatus may realize the QPSK modulation by inserting the information bits into an imaginary axis (Q axis) while mapping the L-SIG to a real axis (I-Axis). The wireless communication apparatus may insert the BSS identification information to the imaginary axis. In a case where the wireless communication apparatus performs the QPSK modulation on the L-SIG, it is preferable that a transmit power of the L-LTF is configured as a power half the L-SIG or a transmit power of the L-SIG is configured as a value double the L-LTF in consideration of the backward compatibility with the wireless communication apparatus corresponding to the conventional IEEE 802.11 standard.

The wireless communication apparatus may associate the BSS identification information with the modulation scheme. For example, the modulation schemes of the symbols (HT-SIG, VHT-SIG-A, HE-SIG-A, HE-SIG-B, HE-STF, and HE-LTF) subsequent to the L-SIG may be associated with the information bits. That is, the wireless communication apparatus may modulate the symbols subsequent to the L-SIG by using any of the BPSK modulation and the quadrature binary phase shift keying (QBPSK) modulation. The wireless communication apparatus on the reception side may measure whether or not the power of the symbol is biased to (the power is distributed on) the real axis or the imaginary axis, and may acquire the corresponding information bit.

For example, a case where the QBPSK modulation is performed on a first symbol subsequent to the L-SIG and the BPSK modulation is performed on a second symbol subsequent to the L-SIG may be an information bit (0, 1). In this example, a BPSK modulation symbol may correspond to 1, and a QBPSK modulation symbol may correspond to 0.

For example, the wireless communication apparatus may interpret that the PPDU corresponds to the IEEE 802.11n standard in a case where an information bit (0, 0) is acquired by detecting (auto detection of) the modulation schemes of two symbols subsequent to the L-SIG.

For example, the wireless communication apparatus may interpret that the PPDU corresponds to the IEEE 802.11ac standard in a case where an information bit (1, 0) is acquired by detecting (auto detection of) the modulation schemes of two symbols subsequent to the L-SIG.

For example, the wireless communication apparatus may interpret that the PPDU corresponds to the IEEE 802.11a standard or the IEEE 802.11g standard in a case where an information bit (1, 1) is acquired by detecting (auto detection of) the modulation schemes of two symbols subsequent to the L-SIG.

For example, the wireless communication apparatus may add the BSS identification information items within the HT-SIG, the VHT-SIG, the HE-SIG-A, and the HE-SIG-B.

The wireless communication apparatus may not use the information items (0, 0), (1, 0), and (1, 1) in order to achieve the backward compatibility. The wireless communication apparatus may construct the information bits by using three or more symbols subsequent to the L-SIG. That is, the wireless communication apparatus may construct the information bits by using the symbols subsequent to the L-SIG, and may map the BSS identification information items.

The wireless communication apparatus may transmit the L-SIG multiple number of times (L-SIG repetition). For example, the wireless communication apparatus on the reception side receives the L-SIG transmitted multiple number of times by using maximum ratio combining (MRC), and thus, the demodulation accuracy of the L-SIG is improved. In a case where the reception of the L-SIG is correctly completed through the MRC, the wireless communication apparatus may interpret that the PPDU including the L-SIG is the PPDU corresponding to the IEEE 802.11ax standard.

The wireless communication apparatus may perform different cyclic shifts on the plurality of L-SIGs acquired through the L-SIG repetition based on the value of the BSS identification information. The wireless communication apparatus on the reception side may acquire the BSS identification information by estimating the cyclic shift amount.

The wireless communication apparatus may perform a reception operation of a part (for example, the preamble, the L-STF, the L-LTF, and the PLCP header prescribed by the IEEE 802.11) of the PPDU other than this PPDU even during the reception operation of the PPDU (also referred to as a diplex reception operation). The wireless communication apparatus may update information regarding a destination address, a transmission source address, or a period of PPDU or DATA in whole or part in a case where a part of the PPDU other than this PPDU is detected during the reception operation of the PPDU.

Ack and BA may also be referred to the response (response frame). A probe response, an authentication response, or an association response may be referred to as the response.

1. First Embodiment

Figure 4:
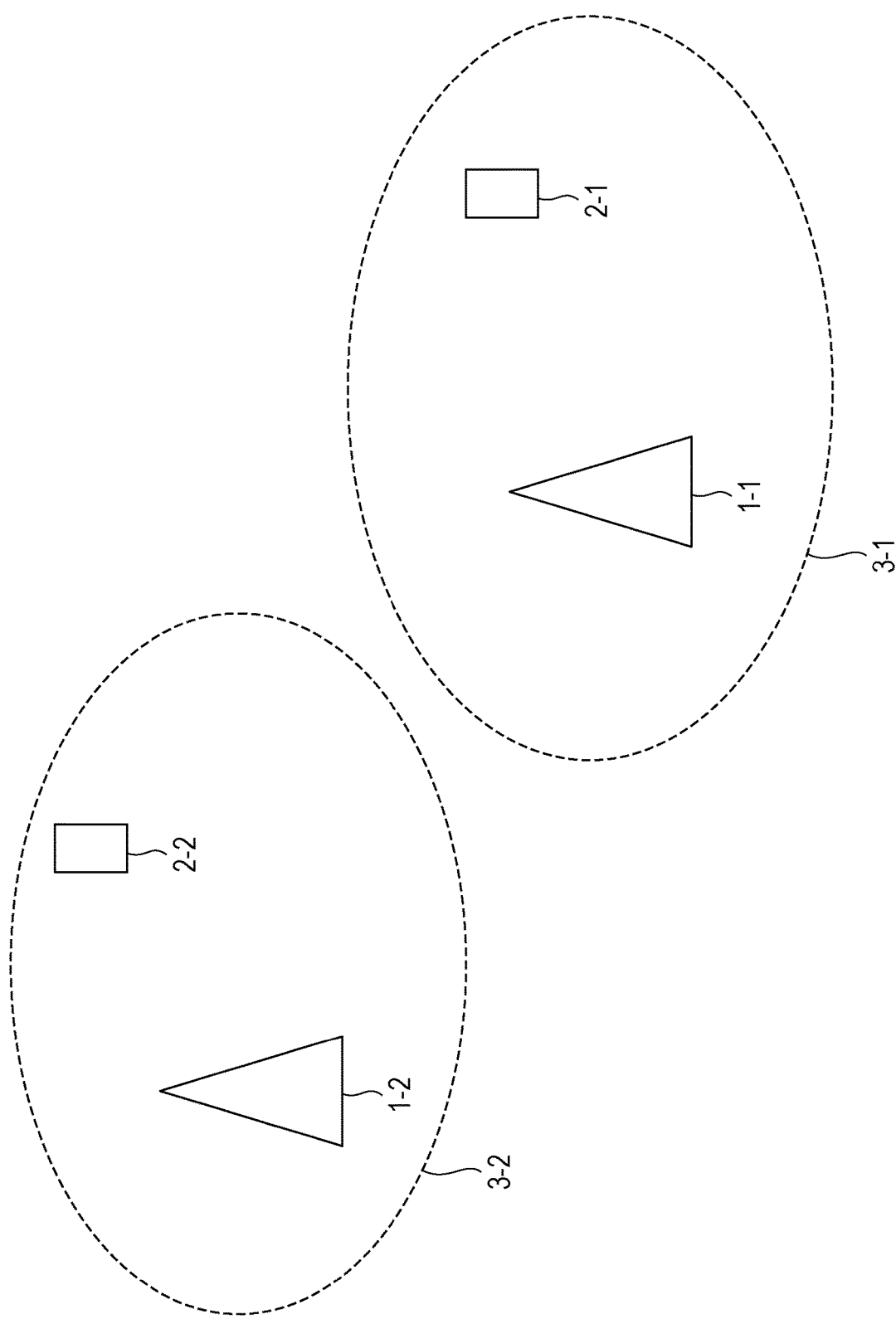
FIG. 4 is a diagram showing an example of a wireless communication system according to the present invention.

FIG. 4 is a diagram showing an example of a wireless communication system according to the present embodiment. A wireless communication system 3-1 includes a wireless communication apparatus 1-1 and a wireless communication apparatus 2-1. The wireless communication apparatus 1-1 is also referred to as a base station apparatus 1-1, and the wireless communication apparatus 2-1 is also referred to as a terminal apparatus 2-1. The wireless communication apparatus 1-1 and the wireless communication apparatus 2-1 are wirelessly connected, and mutually perform the transmission and reception of the PPDU. A wireless communication system 3-2 is disposed in addition to the wireless communication system 3-1. The wireless communication system 3-2 includes a wireless communication apparatus 1-2 and a wireless communication apparatus 2-2. The wireless communication apparatus 1-2 is also referred to as a base station apparatus 1-2, and the wireless communication apparatus 2-2 is also referred to as a terminal apparatus 2-2. Although a case where the wireless communication system 3-1 and the wireless communication system 3-2 constitute different BSSs has been described, this case does not mean that extended service sets (ESSs) are not different. The ESS is a service set constituting a local area network (LAN). That is, the wireless communication apparatuses belonging to the same ESS may be regarded as belonging to the same network from the higher layer.

Figure 5:
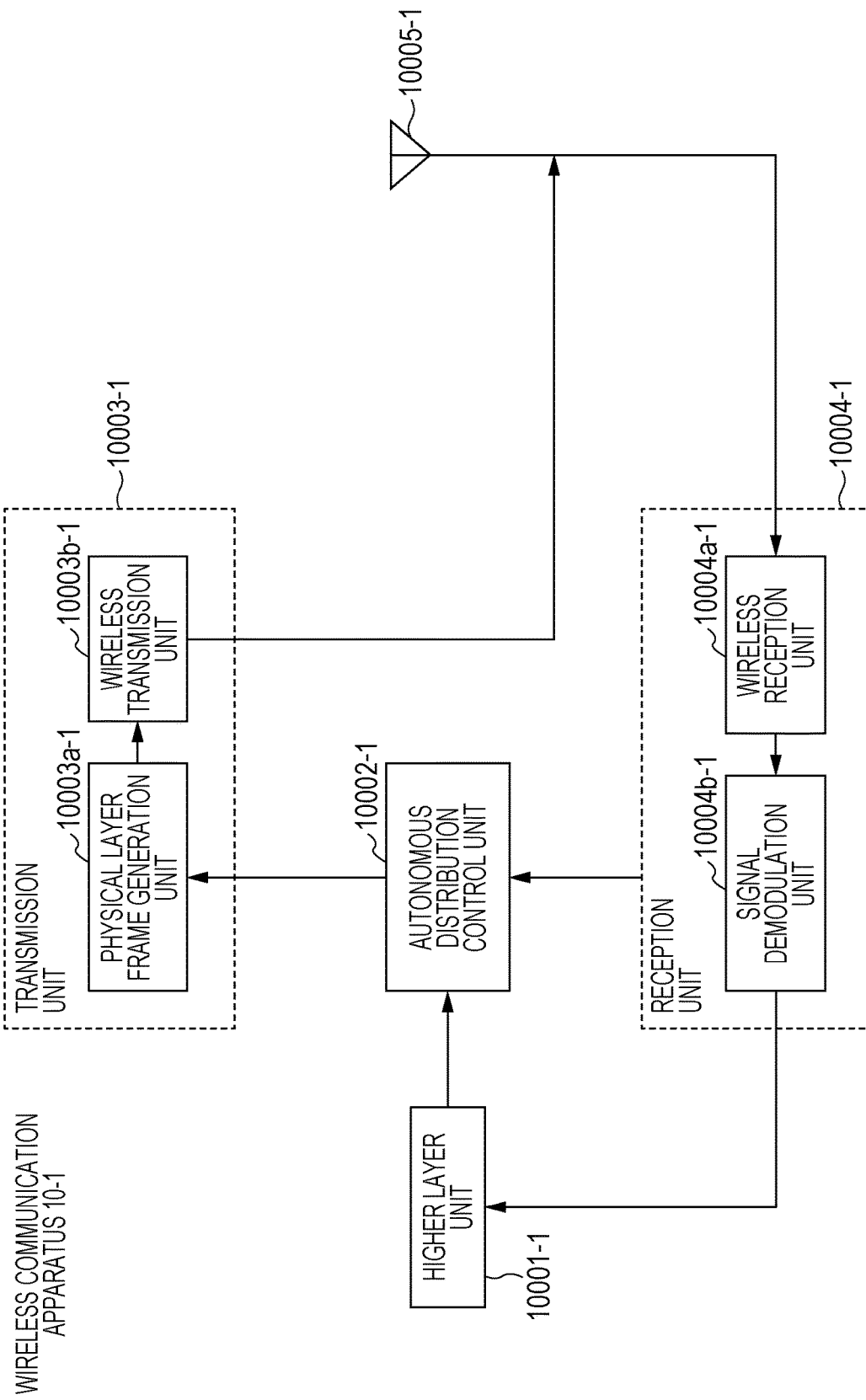
FIG. 5 is a diagram showing an example of an apparatus structure of the wireless communication apparatus according to the present invention.

FIG. 5 is a diagram showing an example of an apparatus configuration of the wireless communication apparatus 1-1, 2-1, 1-2, or 2-2 (hereinafter, also referred to as a wireless apparatus 10-1). The wireless communication apparatus 10-1 includes a higher layer unit 10001-1, an autonomous distribution control unit 10002-1, a transmission unit 10003-1, a reception unit 10004-1, and an antenna unit 10005-1.

The higher layer unit 10001-1 may be connected to another network, and may notify the autonomous distribution control unit 10002-1 of information regarding traffic. For example, the information regarding the traffic may be information addressed to another wireless communication apparatus, or may be control information included in the management frame or the control frame.

Figure 6:
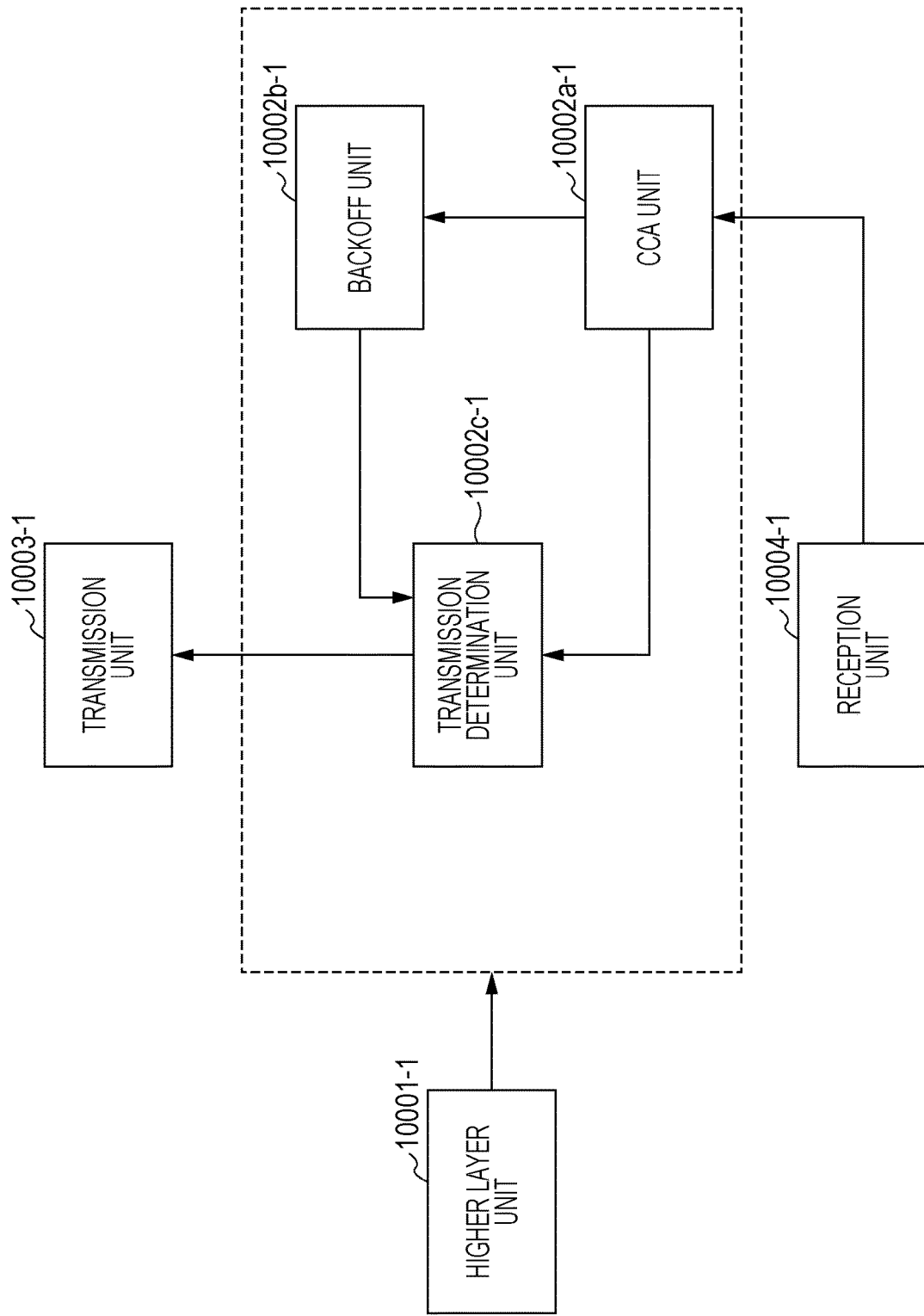
FIG. 6 is a diagram showing an example of a unit structure of an autonomous distribution control unit according to the present invention.

FIG. 6 is a diagram showing an example of a unit structure of the autonomous distribution control unit 10002-1. The autonomous distribution control unit 10002-1 includes a CCA unit 10002a-1, a backoff unit 10002b-1, and a transmission determination unit 10002c-1.

The CCA unit 10002a-1 may perform the mode determination (including the determination of busy or idle) of the radio resource by using any one or both of information regarding a received signal power received through the radio resource and information (including decoded information) regarding the received signal, which are notified from the reception unit. The CCA unit 10002a-1 may notify the backoff unit 10002b-1 and the transmission determination unit 10002c-1 of mode determination information of the radio resource.

The backoff unit 10002b-1 may perform backoff by using the mode determination information of the radio resource. The backoff unit 10002b-1 has a function of generating the CW and counting down the CW. For example, the backoff unit may count down the CW in a case where the mode determination information of the radio resource indicates the idle mode, and may stop counting down the CW in a case where the mode determination information of the radio resource indicates the busy mode. The backoff unit 10002b-1 may notify the transmission determination unit 10002c-1 of the value of the CW.

The transmission determination unit 10002c-1 performs transmission determination by using any one or both of the mode determination information of the radio resource and the value of the CW. For example, in a case where the mode determination information of the radio resource indicates the idle mode and the value of the CW is zero, the transmission determination unit may notify the transmission unit 10003-1 of transmission determination information. In a case where the mode determination information of the radio resource indicates the idle mode, the transmission determination unit may notify the transmission unit 10003-1 of the transmission determination information.

The transmission unit 10003-1 includes a physical layer frame generation unit 10003a-1 and a wireless transmission unit 10003b-1. The physical layer frame generation unit 10003a-1 has a function of generating the physical layer frame (PPDU) based on the transmission determination information notified from the transmission determination unit 10002c-1. The physical layer frame generation unit 10003a-1 performs error correction coding, modulation, and precoding filter multiplication on the transmission frame delivered from the higher layer. The physical layer frame generation unit 10003*a*-1 notifies the wireless transmission unit 10003*b*-1 of the generated physical layer frame.

The wireless transmission unit 10003*b*-1 converts the physical layer frame generated by the physical layer frame generation unit 10003*a*-1 into a signal having a radio frequency (RF) band, and generates a radio-frequency signal. A process performed by the wireless transmission unit 10003*b*-1 includes digital-to-analog conversion, filtering, and frequency conversion from a baseband to an RF band.

The reception unit 10004-1 includes a wireless reception unit 10004*a*-1 and a signal demodulation unit 10004*b*-1. The reception unit 10004-1 generates information regarding a received signal power from the signal having the RF band received by the antenna unit 10005-1. The reception unit 10004-1 may notify the CCA unit 10002*a*-1 of the information regarding the received signal power and the information regarding the received signal.

The wireless reception unit 10004*a*-1 has a function of converting the signal having the RF band received by the antenna unit 10005-1 into a baseband signal and generating the physical layer signal (for example, physical layer frame). A process performed by the wireless reception unit 10004*a*-1 includes a frequency conversion process from the RF band to the baseband, filtering, and analog-to-digital conversion.

The signal demodulation unit 10004*b*-1 has a function of demodulating the physical layer signal generated by the wireless reception unit 10004*a*-1. A process performed by the signal demodulation unit 10004*b*-1 includes channel equalization, demapping, and error correction decoding. For example, the signal demodulation unit 10004*b*-1 may extract information included in the physical layer header, information included in the MAC header, and information included in the transmission frame from the physical layer signal. The signal demodulation unit 10004*b*-1 may notify the higher layer unit 10001-1 of the extracted information. The signal demodulation unit 10004*b*-1 may extract any one or all of the information included in the physical layer header, the information included in the MAC header, and the information included in the transmission frame.

The antenna unit 10005-1 has a function of transmitting the radio-frequency signal generated by the wireless transmission unit 10003*b*-1 toward the wireless apparatus 0-1 in a wireless space. The antenna unit 10005-1 has a function of receiving the radio-frequency signal transmitted from the wireless apparatus 0-1.

The wireless communication apparatus 10-1 may insert the BSS identification information into the PPDU, and may transmit the PPDU in the wireless space. Hereinafter, it will be described that the BSS identification information items included in the PPDUs transmitted by the wireless communication apparatus 1-1 and the wireless communication apparatus 2-1 and the BSS identification information items transmitted by the wireless communication apparatus 1-2 and the wireless communication apparatus 2-2 are different from each other. In a case where the wireless communication apparatuses 10-1 constitute the same ESS, the BSS identification information may be configured through signaling from any of the wireless communication apparatuses 10-1, the wireless communication apparatus other than the wireless communication apparatus 10-1, or a higher layer apparatus. In a case where the wireless communication system 3-1 and the wireless communication system 3-2 constitute different ESSs, the wireless communication apparatuses 10-1 may autonomously configure the BSS identification information items. However, the method of configuring the BSS identification information is not limited.

Since the wireless communication apparatus 1-1 and the wireless communication apparatus 2-1 belong to the same BSS, it is preferable that the same BSS identification information is used. Similarly, since the wireless communication apparatus 1-2 and the wireless communication apparatus 2-2 belong to the same BSS, the beacon transmitted by the wireless communication apparatus 1-1 may be transmitted while including the BSS identification information or the information associated with the BSS identification information, and the BSS identification information may be acquired from the beacon received by the wireless communication apparatus 2-1.

Figure 7:
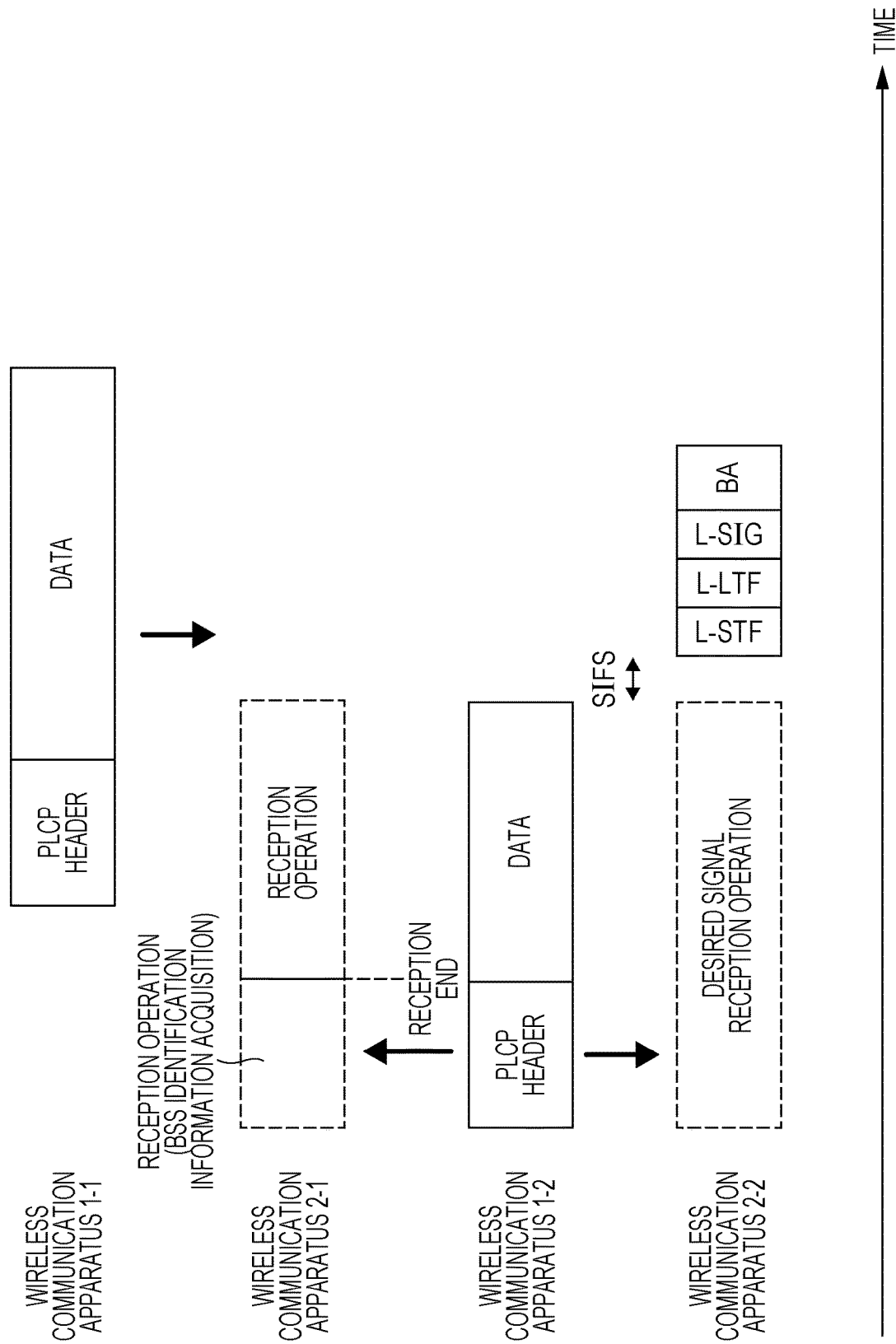
FIG. 7 is a diagram showing an example of an operation of the wireless communication apparatus according to the present invention.

FIG. 7 is a diagram showing an example of an operation of the wireless communication apparatus 2-1. The PPDU includes the PLCP header and the MAC frame. The PLCP header includes a plurality of L-STF, L-LTF, L-SIG, HT-SIG, HT-STF, HT-STF, VHT-SIG-A, VHT-STF, VHT-LTF, VHT-SIG-B, HE-SIG, HE-SIG-A, HE-SIG-B, HE-LTF, and HE-LTF. In the example shown in FIG. 7, the wireless communication apparatus 1-2 initially transmits the PPDU. The wireless communication apparatuses 10-1 other than the wireless communication apparatus 1-2 detect the preamble, and demodulate the L-SIG. In this example, it is assumed that the PPDU transmitted by the wireless communication apparatus 1-2 is detected by the wireless communication apparatus 2-1 and the wireless communication apparatus 2-2. The wireless communication apparatus 2-1 and the wireless communication apparatus 2-2 may receive the PLCP header, and may acquire the BSS identification information. The wireless communication apparatus 2-2 may acquire the BSS identification information, and may recognize that the PPDU belongs to the same BSS as that of the wireless communication apparatus 2-2. The wireless communication apparatus 2-2 may recognize that the MAC frame is addressed to the wireless communication apparatus 2-2 by receiving the MAC frame within the DATA, and transmits the PPDU including the BA to the wireless communication apparatus 1-2 after the wireless communication apparatus 2-2 is on standby for the period of the SIFS after the reception of the MAC frame is completed.

Meanwhile, the wireless communication apparatus 2-1, that is, the wireless apparatus receives the PLCP header transmitted by the wireless communication apparatus 1-2, and acquires the BSS identification information. However, in the example shown in FIG. 7, the wireless communication apparatus 2-1 continue to receive the PPDU transmitted by the wireless communication apparatus 1-2 (or the wireless communication apparatus 2-1 receives the PLCP header and ends the reception operation but configures the NAV). Thus, since the wireless communication apparatus 1-1 transmits the PPDU (for example, the PPDU addressed to the wireless communication apparatus 2-1) to be transmitted later than the PPDU transmitted by the wireless communication apparatus 1-2, the wireless communication apparatus 2-1 is not able to receive the PLCP header within the PPDU. Accordingly, the detection rate of the PLCP header of the wireless communication apparatus 2-1 is decreased, and the MAC frame within the DATA subsequent to the PLCP header is not able to be demodulated.

Figure 8:
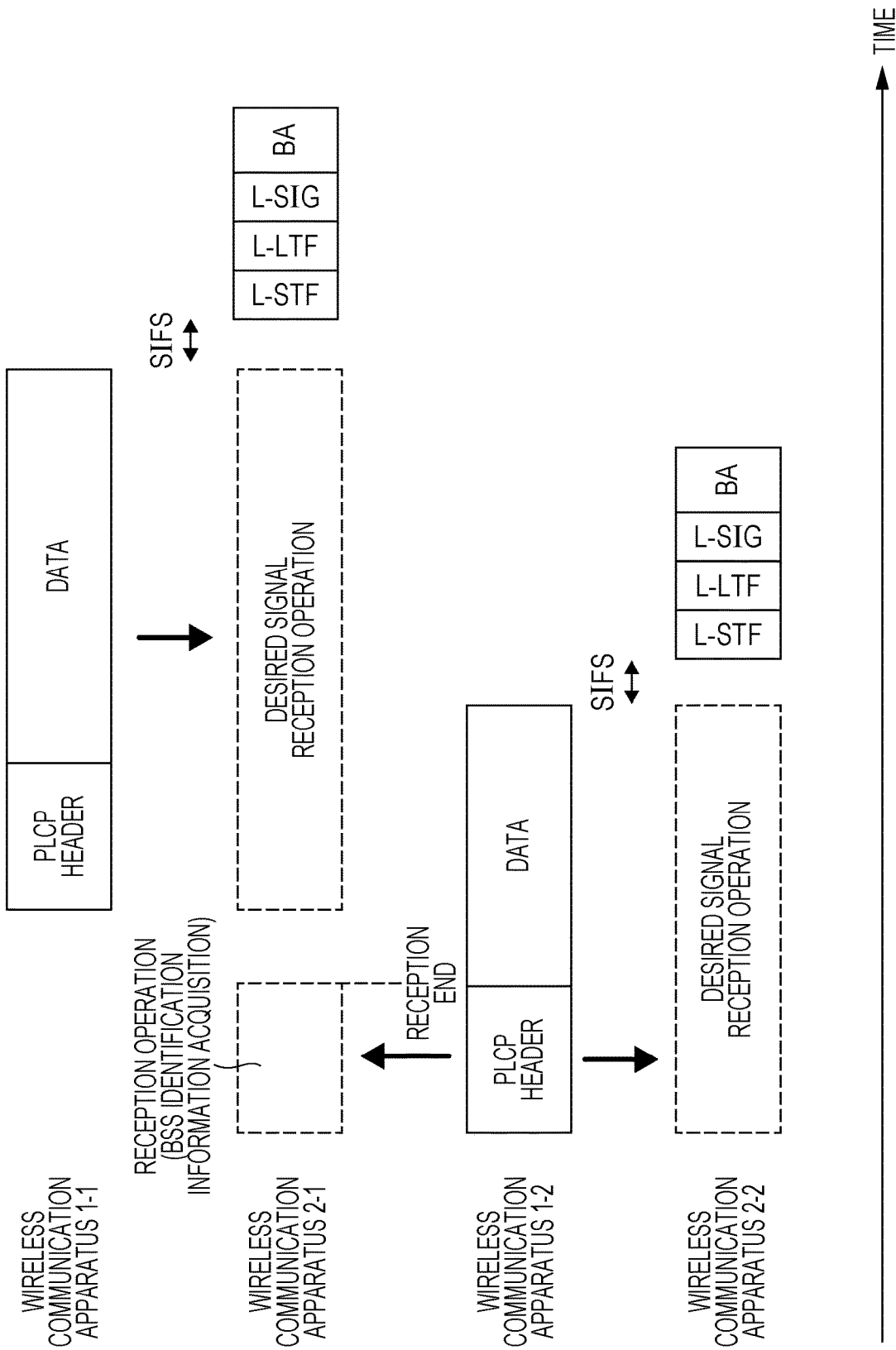
FIG. 8 is a diagram showing another example of the operation of the wireless communication apparatus according to the present invention.

FIG. 8 is a diagram showing another example of the operation of the wireless communication apparatus 2-1. Similarly to the example shown in FIG. 7, the wireless communication apparatus 2-1 initially demodulates the PLCP header transmitted by the wireless communication apparatus 1-2, and acquires the BSS identification information. Since the wireless communication apparatus 2-1 recognizes that the PPDU is not addressed to the BSS to which the wireless communication apparatus 2-1 belongs by acquiring the BSS identification information, the wireless communication apparatus 2-1 ends the reception operation after the reception of the PLCP header is completed. Accordingly, the wireless communication apparatus 2-1 may subsequently receive the PLCP header addressed to the wireless communication apparatus 2-1 transmitted from the wireless communication apparatus 1-1 or the MAC frame within the DATA, and may demodulate the received PLCP header or MAC address. Thereafter, the wireless communication apparatus 2-1 may be on standby for the period of the SIFS, and may transmit the PPDU including the BA to the wireless communication apparatus 1-1.

As described above, the wireless communication apparatus may increase utilization efficiency of the wireless communication system by changing the reception operation based on the BSS identification information.

Figure 9:
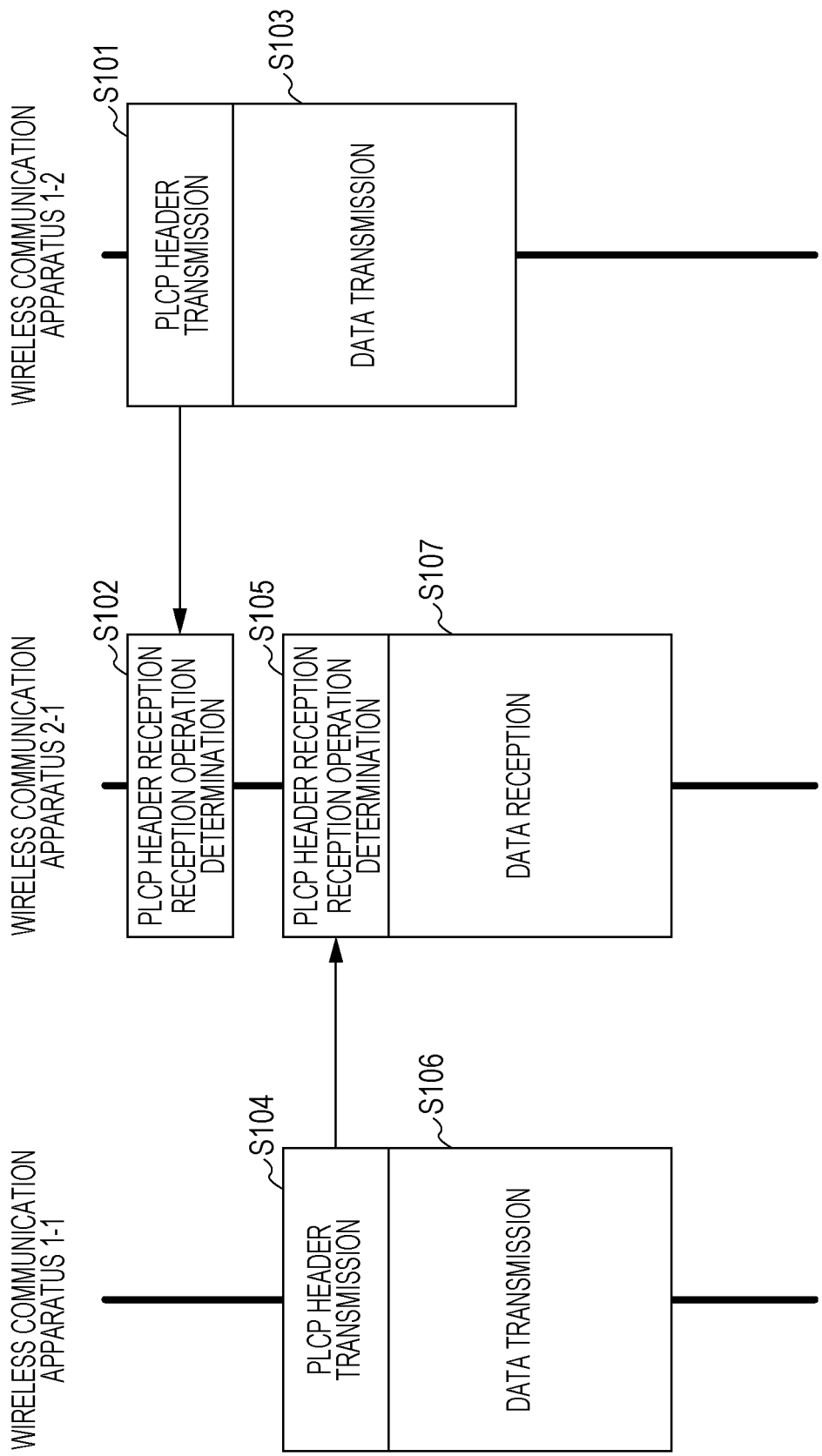
FIG. 9 is a sequence chart showing an example of the operation of the wireless communication apparatus according to the present invention.

FIG. 9 is a sequence chart showing an example of the operation of the wireless communication apparatus 10-1. The wireless communication apparatus 1-2 transmits the PLCP header transmitted by the wireless communication apparatus 1-2 (step S101). The wireless communication apparatus 2-1 receives the PLCP header transmitted by the wireless communication apparatus 1-2, and performs reception operation determination (step S102). The method of the reception operation determination will be described below. Subsequently to step S101, the wireless communication apparatus 1-2 transmits the DATA (step S103). Thereafter, the wireless communication apparatus 1-1 transmits the PLCP header (step S104). The wireless communication apparatus 2-1 receives the PLCP header transmitted by the wireless communication apparatus 1-1, and performs the reception operation determination (step S105). Subsequently to step S104, the wireless communication apparatus 1-1 transmits the DATA (step S106). The wireless communication apparatus 2-1 receives the DATA transmitted by the wireless communication apparatus 1-1 (step S107).

The wireless communication apparatus 2-1 performs the reception operation determination. The reception operation determination is a method of determining the method of the reception operation to be subsequently performed during the reception of the PPDU. For example, the wireless communication apparatus 2-1 performs the reception operation determination by using the BSS identification information included in the PLCP header. In a case where the wireless communication apparatus 2-1 determines that the PPDU is associated with the BSS to which the wireless communication apparatus 2-1 belongs by using the BSS identification information (also referred to as, for example, a case where it is determined that the PPDU is the signal addressed to the wireless communication apparatus belonging to the BSS, a case where the PPDU includes the same information as the BSS identification information of the BSS, or a case where it is determined that the PPDU is associated with myBSS to be described below), the wireless communication apparatus 2-1 performs the operation for continuing the reception operation. Alternatively, in a case where it is determined that the PPDU is associated with the myBSS, the wireless communication apparatus 2-1 configures the NAV. In a case where the wireless communication apparatus 2-1 determines that the PPDU is not associated with the BSS to which the wireless communication apparatus 2-1 belongs by using the BSS identification information (also referred to as, for example, a case where it is determined that the PPDU is the signal addressed to a wireless communication apparatus other than the wireless communication apparatus belonging to the BSS, a case where the PPDU includes information different from the BSS identification information of the BSS, or a case where it is determined that the PPDU is associated with the overwrapped BSS (OBSS)), the wireless communication apparatus 2-1 ends the reception operation.

In a case where the DATA subsequent to the L-SIG corresponds to the IEEE 802.11ax standard, the wireless communication apparatus 2-1 may perform the reception operation determination. In a case where the DATA subsequent to the L-SIG corresponds to the standard other than the IEEE 802.11ax standard, the wireless communication apparatus 2-1 may not perform the reception operation determination.

In a case where it is determined that the PPDU is associated with the OBSS through the reception operation determination, the wireless communication apparatus 2-1 may operate so as not to transmit the signal for the TXTIME included in the L-SIG or the L-SIG Duration. The wireless communication apparatus 2-1 does not transmit the signal for the TXTIME or the L-SIG Duration period, but may detect the preamble or detect the PLOP header. Hereinafter, a case where the wireless communication apparatus 2-1 does not transmit the signal but may detect the preamble or detect the PLOP header is also referred to as a receiver state. For example, the wireless communication apparatus 2-1 may configure the receiver state.

In a case where it is determined that the PPDU is associated with the OBSS through the reception operation determination, the wireless communication apparatus 2-1 may configure the receiver state. A period of the receiver state may be configured by the TXTIME included in the L-SIG or the L-SIG Duration or may be configured by using the LENGTH field included in the PLCP header within the DATA or information associated with a PPDU transmission period other than the LENGTH field.

In a case where it is determined that the PPDU is associated with the OBSS through the reception operation determination, the wireless communication apparatus 2-1 may configure the NAV. In this case, the wireless communication apparatus 2-1 that configures the NAV may perform the reception operation unlike the typical NAV.

In a case where it is determined that the PPDU is associated with the OBSS through the reception operation determination, the wireless communication apparatus 2-1 may be on standby for the transmission for the IFS. The period of the IFS of the wireless communication apparatus 2-1 may be configured by the TXTIME included in the L-SIG or the L-SIG Duration or may be configured by using the LENGTH field included in the PLCP header within the DATA or the information associated with the PPDU transmission period other than the LENGTH field. Alternatively, the already prescribed IFS period may be configured. For example, the wireless communication apparatus 2-1 may configure the IFS period by using the TXTIME included in the L-SIG or the L-SIG Duration by repeating the IFS. The wireless communication apparatus 2-1 may be on standby for the transmission by the LENGTH field included in the PLCP header within the DATA or the PPDU transmission period other than the LENGTH field or may be on standby for the transmission for AIFS.

In a case where it is determined that the PPDU is associated with the OBSS through the reception operation determination, the wireless communication apparatus 2-1 may configure the backoff. The backoff period of the wireless communication apparatus 2-1 may be configured by the TXTIME included in the L-SIG or the L-SIG Duration, or may be configured by the period corresponding to the LENGTH field included in the PLCP header within the DATA or the PPDU transmission period other than the LENGTH field. The wireless communication apparatus 2-1 may repeat random backoff.

The wireless communication apparatus 2-1 may select an operation such that the NAV is configured or the NAV is not configured or an operation for canceling the NAV based on the reception operation determination. For example, in a case where it is determined that the PPDU is associated with the OBSS through the reception operation determination, the wireless communication apparatus 2-1 may not configure the NAV or may configure the NAV.

In a case where it is determined that the PPDU is associated with the myBSS through the reception operation determination, the wireless communication apparatus 2-1 may not configure the NAV or may configure the NAV, or may cancel the NAV.

The wireless communication apparatus 2-1 may perform the diplex reception operation in a case where it is determined that the PPDU is associated with the myBSS through the reception operation determination, and may not perform the diplex reception operation in a case where it is determined that the PPDU is associated with the OBSS.

The wireless communication apparatus 2-1 may not perform the diplex reception operation in a case where it is determined that the PPDU is associated with the myBSS through the reception operation determination, and may perform the diplex reception operation in a case where it is determined that the PPDU is associated with the OBSS.

As described above, the wireless communication apparatus 2-1 can appropriately perform the preamble detection by changing the operation based on the BSS identification information, and improve the frequency efficiency.

2. Second Embodiment

The wireless communication system according to the present embodiment has the same structure as that of the wireless communication system shown in FIG. 4, and thus, the description thereof will be omitted. The apparatus structure of the wireless communication apparatus 10-1 according to the present embodiment is the same apparatus structure of the wireless communication apparatus shown in FIGS. 5 and 6.

Figure 11:
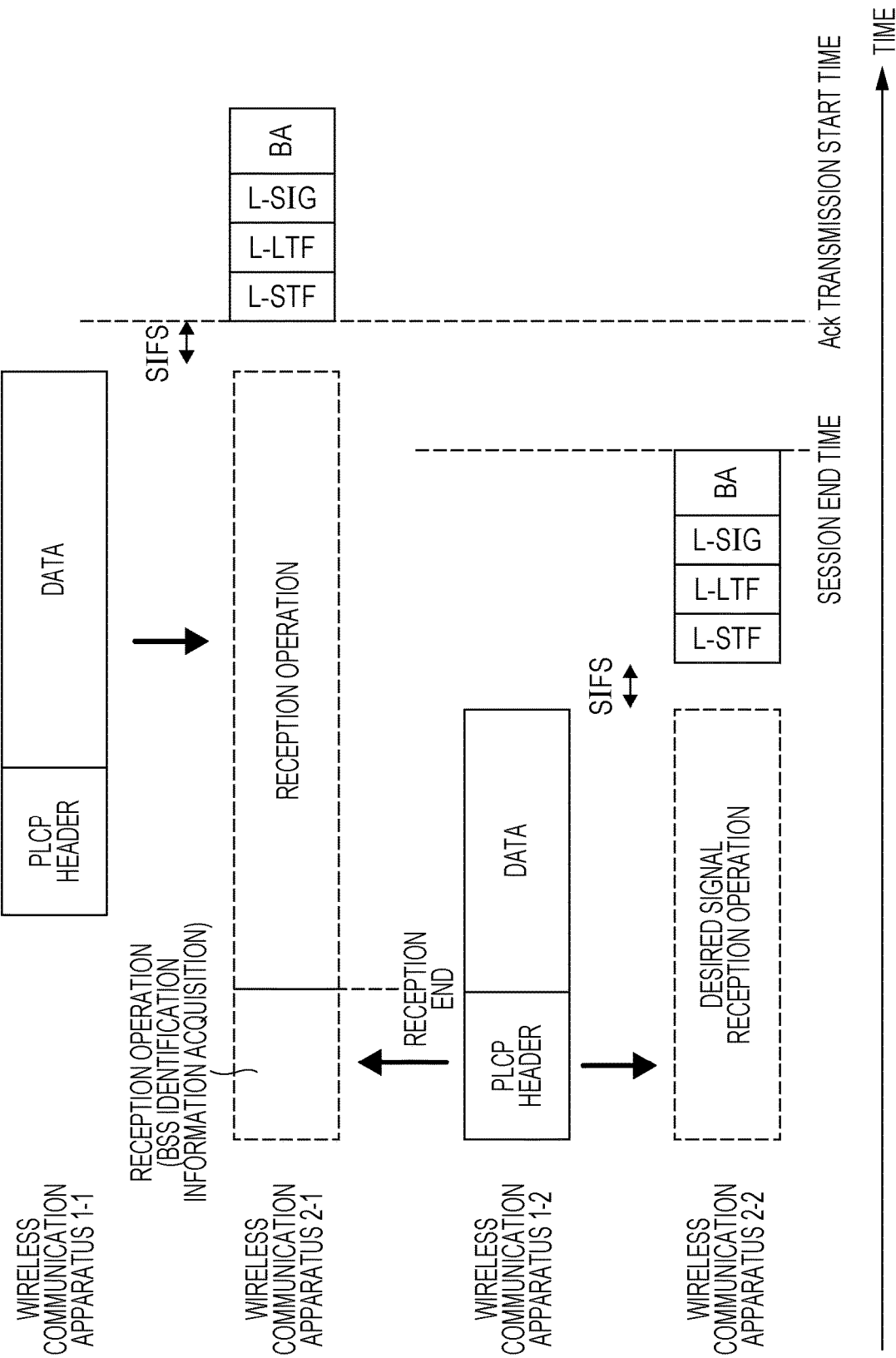
FIG. 11 is a diagram showing an example of the wireless communication apparatus according to the present invention.

FIG. 11 is a diagram showing an example of the operation of the wireless communication apparatus 10-1. Initially, the wireless communication apparatus 1-2 transmits the PLCP header. The wireless communication apparatus 2-1 and the wireless communication apparatus 2-2 receive the PLCP header transmitted from the wireless communication apparatus 1-2, and acquire the BSS identification information. In the example shown in FIG. 11, it is assumed that the PPDU transmitted by the wireless communication apparatus 1-2 is not detected in whole or part. The wireless communication apparatus 2-2 determines that the PPDU is associated with the myBSS by using the BSS identification information, and starts the reception of the DATA subsequent to the PLCP header. In this example, it is assumed that the PPDU transmitted by the wireless communication apparatus 1-2 is addressed to the wireless communication apparatus 2-2, and the wireless communication apparatus 2-2 may transmit the BA to the wireless communication apparatus 1-2 in a case where the reception of a desired signal is correctly completed. In FIG. 11, a transmission end time of the BA transmitted by the wireless communication apparatus 2-2 is referred to as a session end time (Ack end time, channel reservation period, or CCA busy period).

Meanwhile, the wireless communication apparatus 2-1 acquires the BSS identification information, and determines that the PPDU is associated with the OBSS. Thus, the wireless communication apparatus 2-1 may end the reception of the PPDU transmitted by the wireless communication apparatus 1-2 through the reception operation determination.

It is assumed that the wireless communication apparatus 1-1 transmits the PPDU addressed to the wireless communication apparatus 2-1 after a time when the wireless communication apparatus 2-1 ends the reception of a PPDU (also referred to as a first PPDU or a first physical layer frame) transmitted from the wireless communication apparatus 1-2. The wireless communication apparatus 2-1 receives the PLCP header included in a PPDU (also referred to as a second PPDU or a second physical layer frame) transmitted from the wireless communication apparatus 1-1. The wireless communication apparatus 2-1 acquires the BSS identification information, and performs the reception operation determination. As the result of the reception operation determination, the wireless communication apparatus 2-1 determines that the PPDU is associated with the myBSS, and starts the reception operation of the DATA subsequent to the PPDU.

Subsequently, the wireless communication apparatus 2-1 may perform transmission operation determination. The wireless communication apparatus 2-1 may perform the transmission operation determination based on information regarding the session end time and an Ack transmission start time. For example, the wireless communication apparatus 2-1 may determine to transmit the PPDU in a case where a session start time arrives earlier than the Ack transmission start time or arrives at the same time as the Ack transmission start time, and the wireless communication apparatus 2-1 may determine not to transmit the PPDU in a case where the session start time arrives later than the Ack transmission start time.

In a case where it is determined to transmit the PPDU through the transmission operation determination, the wireless communication apparatus 2-1 may transmit a PPDU (also referred to as a third PPDU or a third physical layer frame). The third PPDU may be the PPDU including the BA.

For example, through the transmission operation determination, the wireless communication apparatus 2-1 may determine not to transmit the PPDU in a case where the session start time arrives earlier than the Ack transmission start time or arrives at the same time as the Ack transmission start time, and the wireless communication apparatus 2-1 may determine to transmit the PPDU in a case where the session start time arrives later than the Ack transmission start time.

For example, the wireless communication apparatus 2-1 may determine to transmit the PPDU or not to transmit the PPDU by acquiring a difference (hereinafter, also referred to as an operation offset, an offset, a time different, or an Ack transmission time) between the session start time and the Ack transmission time through the transmission operation determination. For example, in a case where a value of the operation offset is greater than (or is equal to or greater than) a threshold configured for the wireless communication apparatus 2-1, the wireless communication apparatus 2-1 may determine to transmit the PPDU. In a case where the value of the operation offset is equal to or less than (or is less than) the threshold configured for the wireless communication apparatus 2-1, the wireless communication apparatus 2-1 may determine to transmit the PPDU. In a case where the value of the operation offset is greater than (or s equal to or greater than) the threshold for the wireless communication apparatus 2-1, the wireless communication apparatus 2-1 may determine not to transmit the PPDU. In a case where the value of the operation offset is equal to or greater than (or is less than) the threshold configured for the wireless communication apparatus 2-1, the wireless communication apparatus 2-1 may determine not to transmit the PPDU.

As a method of calculating the value of the operation offset, the value of the operation offset may be calculated by using operation offset=session start time−Ack transmission time, operation offset=Ack transmission time−session start time, operation offset=abs (session start time−Ack transmission time), and abs (operation offset=Ack transmission time−session start time). In this method, abs (•) may be an operation for acquiring an absolute value of •.

The wireless communication apparatus 2-1 may determine to transmit the PPDU through the transmission operation determination in a case where the PLCP is correctly received, or may determine to transmit the PPDU in a case where the DATA is correctly received. The wireless communication apparatus 2-1 may determine not to transmit the PPDU through the transmission operation determination in a case where the PLCP is not able to be correctly received, and may determine not to transmit the PPDU in a case where the DATA is not able to be correctly received.

In a case where the wireless communication apparatus 2-1 determines to transmit the PPDU through the transmission operation determination, the wireless communication apparatus 2-1 may restrict the type (priority, length, frame type (management frame, control frame, or data frame), or frame format) of the PPDU capable of being transmitted by the wireless communication apparatus 2-1. That is, for a period corresponding to the TXTIME or the L-SIG Duration after the reception operation is ended, the wireless communication apparatus 2-1 may specify the type of the PPDU which is not capable of being transmitted even though it determined to transmit the PPDU through the transmission operation determination.

For example, the wireless communication apparatus 2-1 may configure such that the CF-END frame is not able to be transmitted even though it is determined to transmit the PPDU through the transmission operation determination.

The wireless communication apparatus 2-1 is able to estimate the session end time. For example, the wireless communication apparatus 2-1 may calculate the session end time by using the Duration information indicated by the Duration/ID field within the PPDU transmitted by the wireless communication apparatus 1-2. The wireless communication apparatus 2-1 may use the Duration information as the information regarding the session end time.

The wireless communication apparatus 2-1 may estimate the session end time by using the information (also referred to as DATA Duration) regarding the TXTIME, L-SIG Duration, or the LENGTH field. For example, the wireless communication apparatus 2-1 may use a value acquired by adding the information regarding the SIFS period and the BA transmission period to the DATA Duration as the session end time. The wireless communication apparatus 2-1 may use the DATA Duration as the session end time. The wireless communication apparatus 2-1 may use a value acquired by adding any one or both of information items regarding IFS and slot time to the DATA Duration as the session end time.

The method of calculating the information regarding the BA transmission period of the wireless communication apparatus 2-1 is not limited. The BA transmission period may be the transmission period of the PPDU including the BA, may be the transmission period of the PPDU including the Ack, may be the transmission period of the PPDU including the CTS, or may be the transmission period of the PPDU including the RTS.

The wireless communication apparatus 2-1 may estimate the Ack transmission start time. The Ack transmission start time may be estimated from the DATA Duration or the Duration information.

For example, the wireless communication apparatus 2-1 may estimate the session end time or the Ack transmission start time from the information included in the PPDU transmitted from the wireless communication apparatus 1-2, or may estimate the session end time or the Ack transmission start time from the information included in the PPDU transmitted from the wireless communication apparatus 1-1.

Figure 12:
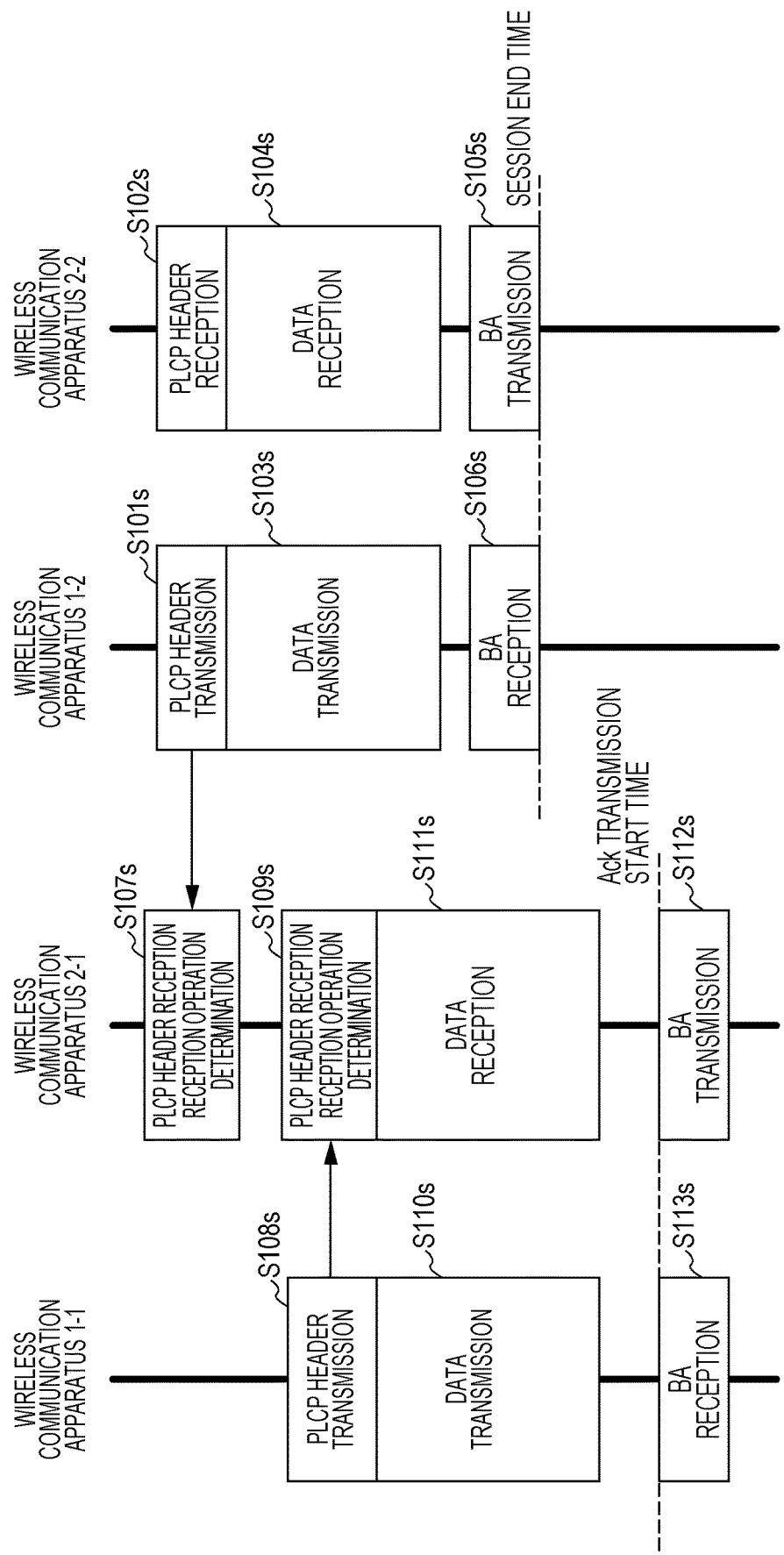
FIG. 12 is a sequence chart showing an example of the wireless communication apparatus according to the present invention.

FIG. 12 is a sequence chart showing an example of a flow of the operation of the wireless communication apparatus 10-1. The wireless communication apparatus 1-2 transmits the PLCP header (step S101s). Subsequently, the wireless communication apparatus 2-2 receives the PLCP header, and performs the operation determination for receiving the result DATA of the reception operation determination (step S102s). Subsequently, the wireless communication apparatus 1-2 transmits the DATA (step S103s), and the wireless communication apparatus 2-2 receives the DATA (step S104s). After the reception of the DATA is completed, the wireless communication apparatus 2-2 transmits the BA after the wireless communication apparatus 2-2 is on standby for the SIFS period (step S105s), and the wireless communication apparatus 1-2 receives the BA (step S106s). The end time of step S105s or step S106s may be used as the session end time.

Meanwhile, the wireless communication apparatus 2-1 performs the reception operation of the PLCP header, and determines not to perform the reception operation of the DATA subsequent to the PLCP header as the result of the reception operation (step S107s). Subsequently, the wireless communication apparatus 1-1 transmits the PLCP header (step S108s). Thereafter, the wireless communication apparatus 2-1 receives the PLCP header, and performs determination for receiving the DATA subsequent to the PLCP header as the result of the reception operation determination (step S109s). Subsequently, the wireless communication apparatus 1-1 transmits the DATA (step S110s), and the wireless communication apparatus 2-1 receives the DATA (step S111s). The wireless communication apparatus 2-1 performs the transmission operation determination based on the information regarding the session end time and the Ack transmission start time. In a case where it is determined to transmit the PPDU, the wireless communication apparatus 2-1 transmits the BA after the DATA is received (step S112s), and the wireless communication apparatus 1-1 receives the BA (step S113s). The start time of step S113s or step S112s may be the Ack transmission start time.

As described embodiment, the wireless communication apparatus 2-1 performs the transmission operation determination, and thus, it is possible to appropriately perform the response to the PPDU received by the wireless communication apparatus 2-1 without influencing the communication of the OBSS. Accordingly, the frequency efficiency of the wireless communication system is improved.

3. Common to all Embodiments

The programs operated in the wireless communication apparatus 1-1, the wireless communication apparatus 2-1, the wireless communication apparatus 1-2, and the wireless communication apparatus 2-2 according to the present invention are programs (programs causing a computer to function) that control a CPU such that the functions of the embodiment according to the present invention are realized. The information items treated by these devices are temporarily accumulated in a RAM during the processing, are stored in various ROMs or HDDs, are read by the CPU if needed, and are modified and rewritten. As a recording medium that stores the programs, any one of a semiconductor medium (for example, ROM or non-volatile memory card), an optical recording medium (for example, DVD, MO, MD, CD, and ED), a magnetic recording medium (for example, magnetic tape and flexible disk) may be used. The functions of the above-described embodiment may be realized by executing the loaded program, or the functions of the present invention may be realized by processing the loaded program in cooperation with an operating system or another application program based on an instruction of the program.

In a case where the program is distributed to the market, the program may be distributed while being stored in a portable recording medium, and may be transmitted to a server computer connected via a network such as the Internet. In this case, a storage device of the server computer may also be included in the present invention. Some or all of the wireless communication apparatus 1-1, the wireless communication apparatus 2-1, the wireless communication apparatus 1-2, and the wireless communication apparatus 2-2 of the above-described embodiment may be typically realized as LSI which is integrated circuit. The functional blocks of the wireless communication apparatus 1-1, the wireless communication apparatus 2-1, the wireless communication apparatus 1-2, and the wireless communication apparatus 2-2 may be separately realized as chips, or some or all thereof may be integrated and realized as chips. In a case where the functional blocks are realized as the integrated circuits, an integrated circuit control unit that controls the integrated circuits is added.

The method of realizing the functional blocks as the integrated circuit is not limited to the LSI, and the functional blocks may be realized by a dedicated circuit or a general-purpose processor. In a case where a technology of realizing the functional blocks as the integrated circuit replaced as the LSI appears by the advance of a semiconductor technology, it may be possible to use an integrated circuit produced using this technology.

This application invention is not limited to the above-described embodiment. The wireless communication apparatus 1-1, the wireless communication apparatus 2-1, the wireless communication apparatus 1-2, and the wireless communication apparatus 2-2 according to application invention are not limited to the application to a mobile station apparatus, and may be applied to stationary or non-movable electronic devices which are installed indoors or outdoors, such as AV devices, kitchen devices, cleaning and washing machines, air conditioners, office devices, vending machines, and other home appliances.

Although the embodiment of the invention has been described in detail with reference to drawings, the specific structure is not limited to this embodiment, and designs within a scope without departing from the gist of the invention are included in the claims.

INDUSTRIAL APPLICABILITY

The present invention is preferably used in the wireless communication apparatus, the communication method, and the communication system.

The international patent application claims priority based on Japanese Patent Application No. 2015-114373 filed on Jun. 5, 2015, and the entire contents of Japanese Patent Application No. 2015-114373 are hereby incorporated by reference.

REFERENCE SIGNS LIST 1-1, 1-2, 2-1, 2-2 Wireless communication apparatus
3-1, 3-2 Management range
10001-1 Higher layer unit
10002-1 Autonomous distribution control unit
10002*a*-1 CCA unit
10002*b*-1 Backoff unit
10002*c*-1 Transmission determination unit
10003-1 Transmission unit
10003*a*-1 Physical layer frame generation unit
10003*b*-1 Wireless transmission unit
10004-1 Reception unit
10004*a*-1 Wireless reception unit
10004*b*-1 Signal demodulation unit
10005-1 Antenna unit

The invention claimed is:

1. A wireless communication apparatus comprising:
reception circuitry configured to detect a frame including information for identifying a Basic Service Set (BSS);
control circuitry configured to switch between a first operation in a case where the frame is a frame which is associated with a BSS to which the wireless communication apparatus belongs and a second operation in a case where the frame is a frame which is not associated with the BSS to which the wireless communication apparatus belongs,
wherein a network allocation vector (NAV) associated with a first duration is configured in the first operation,
wherein an NAV associated with a second duration is configured in the second operation, and
the first duration is different from the second duration.

2. The wireless communication apparatus according to claim 1,
wherein carrier sensing is not performed in the first operation, and the carrier sensing is performed in the second operation.

3. The wireless communication apparatus according to claim 1,
wherein a MAC header of the frame is detected in the first operation, and the MAC header of the frame is not detected in the second operation.

4. The wireless communication apparatus according to claim 1,
wherein the frame is decoded in the first operation, and the frame is not decoded in the second operation.

5. The wireless communication apparatus according to claim 1,
wherein an NAV is configured based on first information included in the frame in the first operation, and
wherein the NAV is configured based on second information included in the frame in the second operation.

6. The wireless communication apparatus according to claim 5,
wherein the first information is an ID/Duration field, and the second information is the information for identifying the BSS.

7. The wireless communication apparatus according to claim 1, wherein carrier sensing is performed in the first operation, and the carrier sensing is not performed in the second operation.

8. The wireless communication apparatus according to claim 1,
wherein the information for identifying the BSS is information included in a PHY header.

9. The wireless communication apparatus according to claim 8,
wherein the PHY header includes HE-SIG-A.

10. The wireless communication apparatus according to claim 1,
wherein the information for identifying the BSS is information included in a MAC header.

11. The wireless communication apparatus according to claim 10,
wherein the information included in the MAC header is a MAC address.

12. The wireless communication apparatus according to claim 1,
wherein the reception circuitry has a function of receiving a plurality of L-SIGs included in the frame, and
wherein the wireless communication apparatus interprets the frame to be a frame corresponding to an IEEE 802.11ax standard in a case where the plurality of L-SIGs is detected.

13. The wireless communication apparatus according to claim 1,
wherein a CF-END frame including a plurality of L-SIGs is transmitted in the first operation.

14. A communication method of a wireless communication apparatus, the method comprising:
detecting a frame including information for identifying a Basic Service Set (BSS);
switching between a first operation in a case where the frame is a frame which is associated with a BSS to which the wireless communication apparatus belongs and a second operation in a case where the frame is a frame which is not associated with the BSS to which the wireless communication apparatus belongs,
wherein a network allocation vector (NAV) associated with a first duration is configured in the first operation,
wherein an NAV associated with a second duration is configured in the second operation, and
the first duration is different from the second duration.

15. An integrated circuit mounted on a wireless communication apparatus, the integrated circuit comprising:
a reception circuit that detects a frame including information for identifying a Basic Service Set (BSS);
a control circuit that switches between a first operation in a case where the frame is a frame which is associated with a BSS to which the wireless communication apparatus belongs and a second operation in a case where the frame is a frame which is not associated with the BSS to which the wireless communication apparatus belongs,
wherein a network allocation vector (NAV) associated with a first duration is configured in the first operation,
wherein an NAV associated with a second duration is configured in the second operation, and
the first duration is different from the second duration.

* * * * *